(12) United States Patent
Isono et al.

(10) Patent No.: US 8,091,356 B2
(45) Date of Patent: Jan. 10, 2012

(54) VEHICULAR BRAKE SYSTEM

(75) Inventors: Hiroshi Isono, Mishima (JP); Yasuji Mizutani, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/874,736

(22) Filed: Sep. 2, 2010

(65) Prior Publication Data

US 2010/0326073 A1 Dec. 30, 2010

Related U.S. Application Data

(62) Division of application No. 11/997,207, filed as application No. PCT/IB2006/002037 on Jul. 26, 2006, now Pat. No. 7,861,523.

(30) Foreign Application Priority Data

Jul. 29, 2005 (JP) ................................ 2005-221790

(51) Int. Cl.
*B60T 13/12* (2006.01)
*B60T 7/04* (2006.01)
(52) U.S. Cl. ................................ 60/552; 60/581; 60/593
(58) Field of Classification Search .................... 60/552, 60/581, 585, 593; 303/113.1
See application file for complete search history.

(56) References Cited

U.S. PATENT DOCUMENTS

| | | | |
|---|---|---|---|
| 5,851,057 A | 12/1998 | Terazawa et al. | |
| 6,233,932 B1 | 5/2001 | Heibel et al. | |
| 6,412,882 B1 | 7/2002 | Isono et al. | |
| 6,705,682 B2 * | 3/2004 | Kusano et al. | 60/552 |
| 6,729,698 B2 * | 5/2004 | Kusano et al. | 303/191 |
| 6,908,160 B2 * | 6/2005 | Kusano | 303/114.1 |
| 6,957,870 B2 * | 10/2005 | Kagawa et al. | 303/113.4 |
| 7,014,277 B2 | 3/2006 | Soga | |
| 2002/0140286 A1 | 10/2002 | Ishimura et al. | |
| 2004/0004394 A1 | 1/2004 | Ganzel | |
| 2004/0227396 A1 * | 11/2004 | Kusano | 303/113.1 |
| 2006/0158026 A1 | 7/2006 | Aoki et al. | |

FOREIGN PATENT DOCUMENTS

| | | |
|---|---|---|
| CN | 1419505 A | 5/2003 |
| DE | 198 33 084 | 2/2000 |
| DE | 102 44 375 | 1/2004 |
| EP | 0 391 353 | 10/1990 |
| EP | 1 142 766 | 10/2001 |

(Continued)

OTHER PUBLICATIONS

Office Action mailed Aug. 10, 2011 in co-pending U.S. Appl. No. 11/996,979.

*Primary Examiner* — Thomas E Lazo
(74) *Attorney, Agent, or Firm* — Oblon, Spivak, McClelland, Maier & Neustadt, L.L.P.

(57) ABSTRACT

In a vehicular brake system, an input piston and a pressure piston are coaxially and axially movably supported in a cylinder, and a brake pedal is coupled to the input piston. Pressure chambers formed on the axially opposite sides of the input piston communicate with each other via a communication passage. A control oil pressure can be supplied to a first supply port of the communication passage, and a reaction-force oil pressure can be supplied to a second supply port of a reaction-force chamber of the input piston, while braking oil pressures can be delivered from delivery ports of the respective pressure chambers.

7 Claims, 22 Drawing Sheets

FOREIGN PATENT DOCUMENTS

| | | |
|---|---|---|
| GB | 2 292 590 | 2/1996 |
| JP | 9-24818 | 1/1997 |
| JP | 2001-514113 | 9/2001 |
| JP | 2001-294146 | 10/2001 |
| JP | 2001-225739 | 8/2002 |
| JP | 2004 243983 | 9/2004 |
| WO | 2004 045934 | 6/2004 |

* cited by examiner

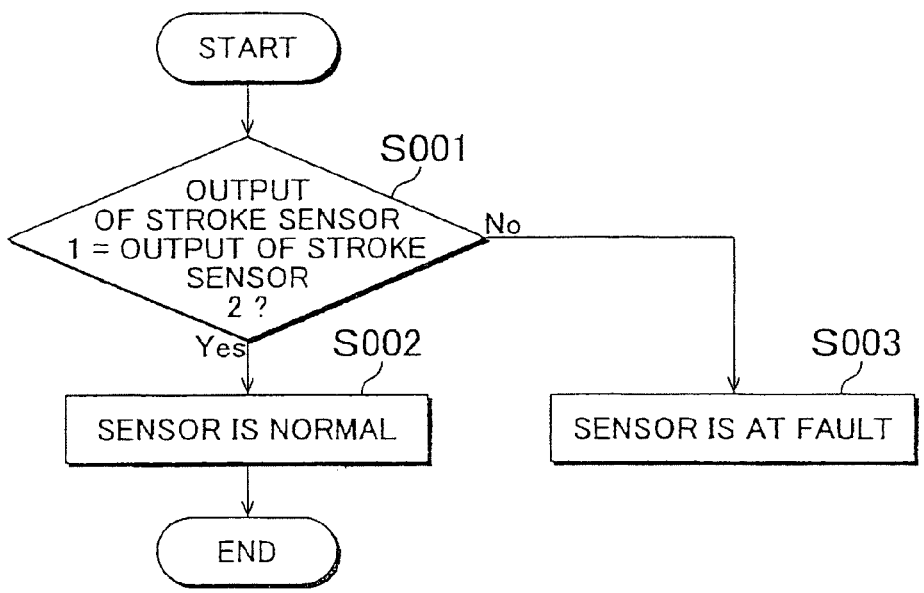
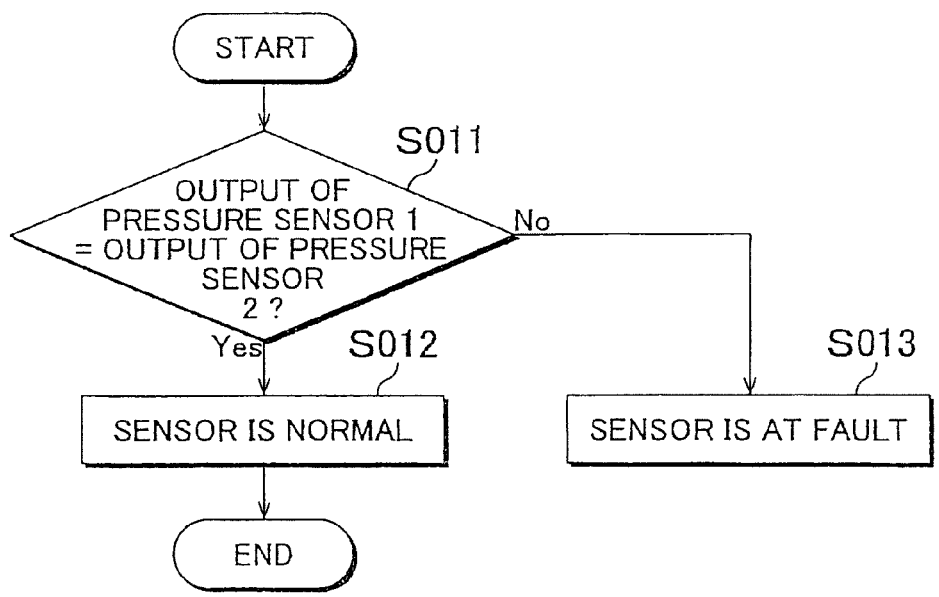

VEHICULAR BRAKE SYSTEM

CROSS REFERENCE

This application is a division of and is based upon and claims the benefit of priority under 35 U.S.C. §120 for U.S. Ser. No. 11/997,207, filed Jan. 29, 2008, the entire contents of each which are incorporated herein by reference. U.S. application Ser. No. 11/997,207 is a National Stage of PCT/IB2006/002037, filed Jul. 26, 2006, and claims the benefit of priority under 35 U.S.C. §119 from Japanese Patent Application No. 2005-221790, filed Jul. 29, 2005.

TECHNICAL FIELD

The invention relates to a brake system for a motor vehicle, which electronically controls the braking force applied to the vehicle in accordance with the amount of a braking operation.

BACKGROUND ART

An electronically controlled brake system for a motor vehicle is known, which electrically controls the braking forces of braking devices for the respective wheels, namely, the hydraulic pressures supplied to wheels cylinders for driving the braking devices, in accordance with the amount of a braking operation, e.g., the amount of depression of a brake pedal. An example of a control apparatus for this type of brake system is disclosed in Japanese Laid-open Patent Publication No. 2004-243983.

In the vehicular brake control system as disclosed in the above-identified publication, when the vehicle operator or driver operates the brake pedal, a master cylinder generates a hydraulic pressure in accordance with the amount of operation of the brake pedal, and a part of the hydraulic oil flows into a stroke simulator so that the amount of operation of the brake pedal (represented by, e.g., pedal stroke) is controlled in accordance with the pedal pressure applied to the brake pedal (i.e., the force with which the brake pedal is depressed by the driver). In the meantime, the brake control system sets a target deceleration of the vehicle in accordance with the pedal stroke detected by brake ECU, and determines the distribution of the braking forces applied to the respective wheels, based on which certain hydraulic pressures are applied to the respective wheel cylinders.

In the known vehicular brake control system as described above, the master cylinder for generating a hydraulic pressure commensurate with the amount of operation of the brake pedal is equipped with the stroke simulator into which a part of the hydraulic oil is fed so as to control the amount of operation of the brake pedal. The master cylinder is also provided with pressurizing mechanisms for pressurizing the hydraulic oil to be supplied to the wheel cylinders of the four wheels via master cut valves. Since the pressurizing mechanisms are provided for the wheel cylinders of the respective wheels, the overall hydraulic system is complicated in construction, resulting in an increase in the manufacturing cost.

DISCLOSURE OF INVENTION

It is therefore an object of the invention to provide a vehicular brake system that is simple in construction and can be manufactured with reduced cost.

To accomplish the above and/or other object(s), there is provided according to a first aspect of the invention a vehicular brake system characterized by comprising: (a) an input piston that is supported in a cylinder to be movable in an axial direction of the cylinder, (b) an operating device coupled to the input piston, (c) a pressure piston that is disposed coaxially with the input piston and is supported in the cylinder to be movable in the axial direction, (d) control oil pressure setting means for setting a control oil pressure in accordance with an amount of operation of the operating device which is received by the input piston, (e) oil pressure supplying means for applying the control oil pressure set by the control oil pressure setting means to the pressure piston so as to generate a braking oil pressure, and (f) operating force absorbing means for absorbing operating force applied from the operating device to the input piston.

In normal operation, the vehicular brake system according to the first aspect of the invention is able to generate the braking oil pressure by applying the control oil pressure commensurate with the amount of operation of the operating device received by the input piston to the pressure piston, while the operating force absorbing means absorbs the operating force applied to the input piston so as to control the reaction force applied to the operating device to an appropriate value. Thus, the brake system, which is simple in construction and can be manufactured at reduced cost, is able to perform appropriate braking force control.

According to a second aspect of the invention, there is provided a vehicular brake system characterized by comprising: (a) an input piston that is supported in a cylinder to be movable in an axial direction of the cylinder, (b) an operating device coupled to the input piston, (c) a pressure piston that is disposed coaxially with the input piston and is supported in the cylinder to be movable in the axial direction such that the pressure piston can be pressed by the input piston, (d) control oil pressure setting means for setting a control oil pressure in accordance with an amount of operation of the operating device which is received by the input piston, (e) oil pressure supplying means for applying the control oil pressure set by the control oil pressure setting means to a first pressure chamber located on one side of the input piston as viewed in the direction of movement of the input piston or a second pressure chamber located on the other side of the input piston so as to generate a braking oil pressure, and (f) a communication passage that allows a hydraulic oil to flow between the first pressure chamber and the second pressure chamber so as to absorb operating force applied from the operating device when the input piston moves in response to the operating force.

In normal operation, the brake system according to the second aspect of the invention is able to generate the braking oil pressure by applying the control oil pressure commensurate with the amount of operation of the operating device received by the input piston to the pressure piston via the first and second pressure chambers, while absorbing operating force applied from the operating device by utilizing the flow of the hydraulic oil between the first pressure chamber and the second pressure chamber, to thereby assure an appropriate value of reaction force exerted on the operating device. Upon occurrence of an abnormality, the operating force applied from the operating device causes the input piston to directly press the pressure piston so as to generate a braking oil pressure. Thus, the brake system, which is simple in construction and can be manufactured at reduced cost, is able to perform appropriate braking force control.

In the vehicular brake system according to the second aspect of the invention, the communication passage may be formed through the input piston. Also, each of the communication passage and delivery passages through which the braking oil pressure is delivered may be in the form of an orifice.

In the vehicular brake system according to the second aspect of the invention, a first pressure-receiving area of the input piston which receives a hydraulic pressure of the first pressure chamber and a second pressure-receiving area of the input piston which receives a hydraulic pressure of the second pressure chamber may be set to be substantially equal to each other.

According to a third aspect of the invention, there is provided a vehicular brake system characterized by comprising: (a) an input piston that is supported in a cylinder to be movable in an axial direction of the cylinder, (b) an operating device coupled to the input piston, (c) a pressure piston that is disposed coaxially with the input piston and is supported in the cylinder to be movable in the axial direction such that one of the input piston and the pressure piston is at least partially received in the other and such that the pressure piston can be pressed by the input piston, (d) control oil pressure setting means for setting a control oil pressure in accordance with an amount of operation of the operating device which is received by the input piston, (e) oil pressure supplying means for applying the control oil pressure set by the control oil pressure setting means to the pressure piston so as to generate a braking oil pressure, and (f) a discharge passage that allows a hydraulic oil to be discharged from a pressure chamber located between the input piston and the pressure piston so as to absorb operating force applied from the operating device when the input piston moves in response to the operating force.

In normal operation, the brake system according to the third aspect of the invention is able to generate the braking oil pressure by applying the control oil pressure commensurate with the amount of operation of the operating device received by the input piston to the pressure piston, while absorbing operating force applied from the operating device by utilizing discharge of the hydraulic oil from the pressure chamber, to thereby assure an appropriate value of reaction force exerted on the operating device. Upon occurrence of an abnormality, the operating force applied from the operating device causes the input piston to directly press the pressure piston so as to generate a braking oil pressure. Thus, the brake system, which is simple in construction and can be manufactured at reduced cost, is able to perform appropriate braking force control.

In the vehicular brake system according to the third aspect of the invention, a first pressure-receiving area of the input piston which receives a hydraulic pressure of the pressure chamber and a second pressure-receiving area of the pressure piston which receives the control oil pressure from the oil pressure supplying means may be set to be substantially equal to each other.

The vehicular brake system according to the second or third aspect of the invention may further include reaction-force setting means for setting a reaction force in accordance with the amount of operation of the operating device which is received by the input piston, and reaction-force supplying means for applying the reaction force set by the reaction-force setting means to the input piston so as to exert the reaction force on the operating device.

The vehicular brake system according to the second or third aspect of the invention may further include reaction-force generating means for generating a reaction force to be applied to the operating device via the input piston, and reaction-force restricting means for restricting the reaction force applied to the operating device by the reaction-force generating means upon occurrence of an abnormality. In this case, the reaction-force restricting means may include a solenoid-operated valve or a relief valve.

According to a fourth aspect of the invention, there is provided a vehicular brake system characterized by comprising: (a) an input piston that is supported in a cylinder to be movable in an axial direction of the cylinder, (b) an operating device coupled to the input piston, (c) a pressure piston that is disposed coaxially with the input piston and is supported in the cylinder to be movable in the axial direction, (d) operating amount detecting means for detecting an amount of operation of the operating device which is received by the input piston, (e) control oil pressure setting means for setting a control oil pressure in accordance with the amount of operation detected by the operating amount detecting means, (f) control oil pressure supplying means for applying the control oil pressure set by the control oil pressure setting means to the pressure piston so as to generate a braking oil pressure, (g) operating force absorbing means for absorbing operating force applied from the operating device to the input piston, (h) reaction-force oil pressure setting means for setting a reaction-force oil pressure in accordance with the amount of operation detected by the operating amount detecting means or the braking oil pressure generated, and (i) reaction-force oil pressure supplying means for applying the reaction-force oil pressure set by the reaction-force oil pressure setting means to the input piston so as to exert reaction force on the operating device.

In normal operation, the brake system according to the fourth aspect of the invention is able to generate the braking oil pressure by applying the control oil pressure commensurate with the amount of operation of the operating device received by the input piston to the pressure piston, and is also able to set the reaction force applied to the operating device to an appropriate value by applying the reaction-force oil pressure commensurate with the amount of operation of the operating device to the input piston while the operating force absorbing means absorbs the operating force applied from the operating device. Thus, the brake system, which is simple in construction and can be manufactured at reduced cost, is able to perform appropriate braking force control and reaction force control.

In the vehicular brake system according to the fourth aspect of the invention, the control oil pressure supplying means may supply the control oil pressure to a first pressure chamber located on one side of the input piston as viewed in the direction of movement of the input piston or a second pressure chamber located on the other side of the input piston, so that the braking oil pressure can be delivered from the first pressure chamber and a third pressure chamber of the pressure piston. In this brake system, a first pressure sensor may be provided for detecting the braking oil pressure delivered from the first pressure chamber, and a second pressure sensor may be provided for detecting the braking oil pressure delivered from the third pressure chamber. When a failure of the operating amount detecting means is detected, the control oil pressure setting means may set the control oil pressure so that the pressure detected by the first pressure sensor becomes substantially equal to the pressure detected by the second pressure sensor.

In the vehicular brake system according to the fourth aspect of the invention, a third pressure sensor may be provided for detecting the reaction-force oil pressure applied to the input piston, and a reaction-force detection sensor may be provided for detecting the reaction force applied to the operating device. In this brake system, the reaction-force oil pressure supplying means may be controlled so that the reaction-force oil pressure set by the reaction-force oil pressure setting means becomes substantially equal to the actual reaction-force oil pressure detected by the third pressure sensor. When a failure of the third pressure sensor is detected, the reaction-force oil pressure setting means may set the reaction-force oil pressure in accordance with the reaction force detected by the reaction-force detection sensor.

In the vehicular brake system according to the fourth aspect of the invention, a failure of the reaction-force oil pressure supplying means may be detected based on a relationship between the amount of operation of the operating device detected by the operating amount detecting means and the reaction force applied to the operating device.

In the vehicular brake system according to the fourth aspect of the invention, the control oil pressure supplying means may supply the control oil pressure to a first pressure chamber located on one side of the input piston as viewed in the direction of movement of the input piston or a second pressure chamber located on the other side of the input piston so that the braking oil pressures can be delivered from the first pressure chamber and a third pressure chamber of the pressure piston. In this brake system, a first pressure sensor may be provided for detecting the braking oil pressure delivered from the first pressure chamber, and a second pressure sensor may be provided for detecting the braking oil pressure delivered from the third pressure chamber. When the braking oil pressure detected by the second pressure sensor is lower than the braking oil pressure detected by the first pressure sensor by a predetermined value or greater, it may be determined that a defect exists in a delivery channel through which the braking oil pressure is delivered from the third pressure chamber, and the reaction-force oil pressure set by the reaction-force oil pressure setting means may be reduced.

In the vehicular brake system according to the fourth aspect of the invention, the control oil pressure supplying means may supply the control oil pressure to a first pressure chamber located on one side of the input piston as viewed in the direction of movement of the input piston or a second pressure chamber located on the other side of the input piston so that the braking oil pressure can be delivered from the first pressure chamber and a third pressure chamber of the pressure piston. In this brake system, a first pressure sensor may be provided for detecting the braking oil pressure delivered from the first pressure chamber. When the braking oil pressure detected by the first pressure sensor is lower than the control oil pressure set by the control oil pressure setting means by a predetermined value or greater, it may be determined that a defect exists in a delivery channel through which the braking oil pressure is delivered from the first pressure chamber, and the reaction-force oil pressure set by the reaction-force oil pressure setting means may be reduced.

In the vehicular brake system according to the fourth aspect of the invention, the control oil pressure supplying means may supply the control oil pressure to a first pressure chamber located on one side of the input piston as viewed in the direction of movement of the input piston or a second pressure chamber located on the other side of the input piston, so that the braking oil pressure can be delivered from the first pressure chamber and a third pressure chamber of the pressure piston. In this brake system, a first pressure sensor may be provided for detecting the braking oil pressure delivered from the first pressure chamber, and a second pressure sensor may be provided for detecting the braking oil pressure delivered from the third pressure chamber. The relationship between the position of the input piston and that of the pressure piston may be determined based on a difference between the pressure detected by the first pressure sensor and the pressure detected by the second pressure sensor.

In the vehicular brake system as described just above, it may be determined whether the input piston and the pressure piston are in contact with each other, based on the amount of operation of the operating device detected by the operating amount detecting means. When the input piston and the pressure piston are not in contact with each other, and the difference between the pressure detected by the first pressure sensor and the pressure detected by the second pressure sensor is equal to or larger than a predetermined value, it may be determined that at least one of the first pressure sensor and the second pressure sensor is at fault.

In the vehicular brake system according to the fourth aspect of the invention, a third pressure sensor may be provided for detecting the reaction-force oil pressure applied to the input piston, and a reaction-force detection sensor may be provided for detecting the reaction force applied to the operating device. In this brake system, a failure of the third pressure sensor or the reaction-force detection sensor may be detected based on the reaction-force oil pressure detected by the third pressure sensor and the reaction force detected by the reaction-force detection sensor. When a failure of the third pressure sensor or the reaction-force detection sensor is detected, an amount of change of the reaction-force oil pressure set by the reaction-force oil pressure setting means may be reduced.

In the vehicular brake system according to the fourth aspect of the invention, the control oil pressure supplying means may supply the control oil pressure to a first pressure chamber located on one side of the input piston as viewed in the direction of movement of the input piston or a second pressure chamber located on the other side of the input piston, so that the braking oil pressure can be delivered from the first pressure chamber and a third pressure chamber of the pressure piston. In this brake system, the reaction-force oil pressure supplying means may apply the reaction-force oil pressure from a reaction-force chamber to the input piston, and leakage of a hydraulic oil between the first pressure chamber and the reaction-force chamber may be detected when the control oil pressure applied to the first pressure chamber is increased in a condition in which the hydraulic oil is inhibited from being discharged from the reaction-force chamber. When the leakage is detected, the control oil pressure setting means may set the control oil pressure based on the reaction force applied to the operating device.

BRIEF DESCRIPTION OF DRAWINGS

The foregoing and/or further objects, features and advantages of the invention will become more apparent from the following description of exemplary embodiments with reference to the accompanying drawings, in which like numerals are used to represent like elements and wherein:

FIG. 9 is a flowchart illustrating a control routine for determining a failure of a stroke sensor;

FIG. 10 is a flowchart illustrating a control routine for determining a failure of a pressure sensor;

MODES FOR CARRYING OUT THE INVENTION

Some embodiments of the vehicular brake system of the invention will be described in detail with reference to the accompanying drawings. It is, however, to be understood that the invention is not limited to these embodiments.

First Embodiment

Figure 1:
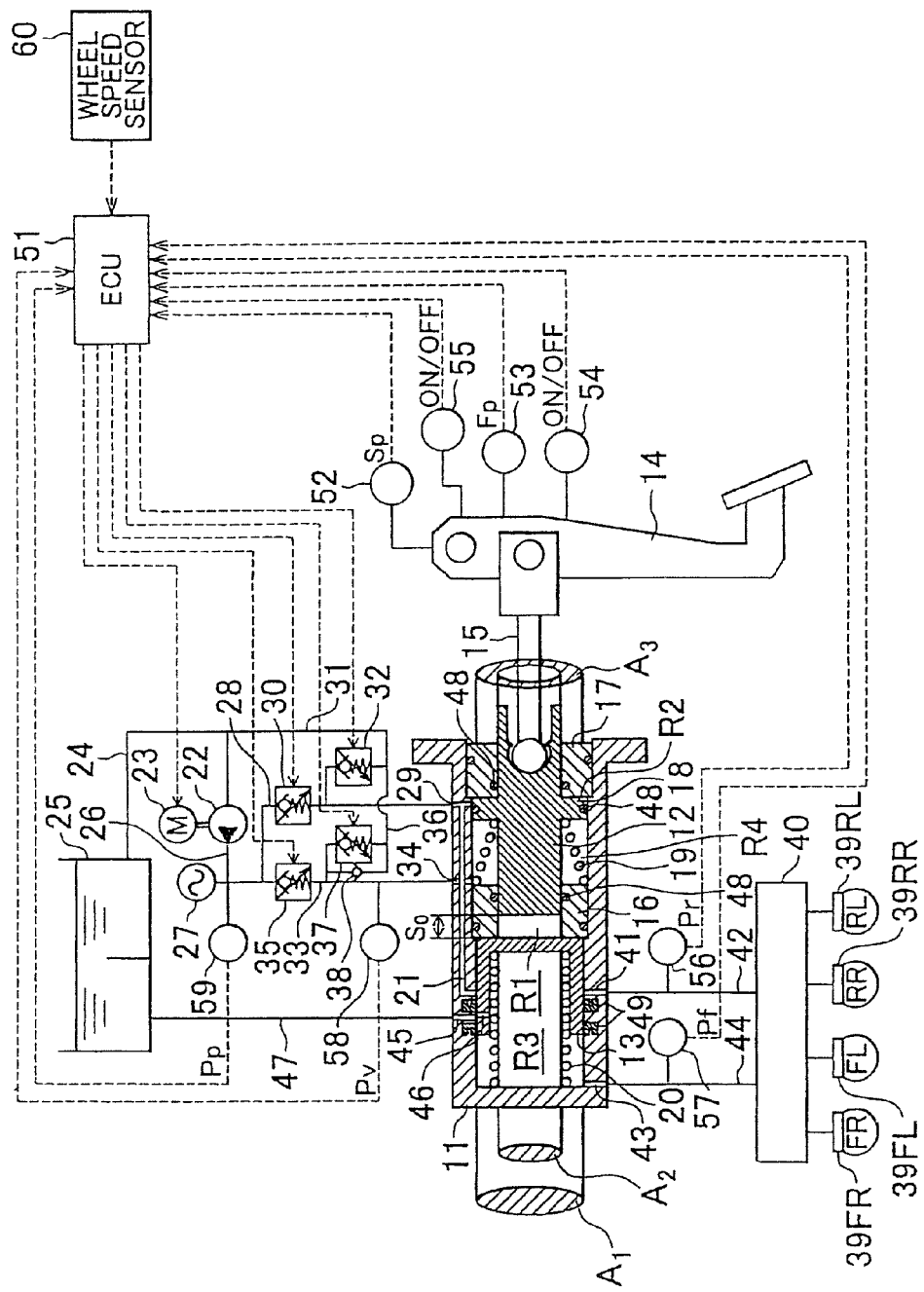
FIG. 1 is a schematic view showing a vehicular brake system constructed according to a first embodiment of the invention.
Figure 2:
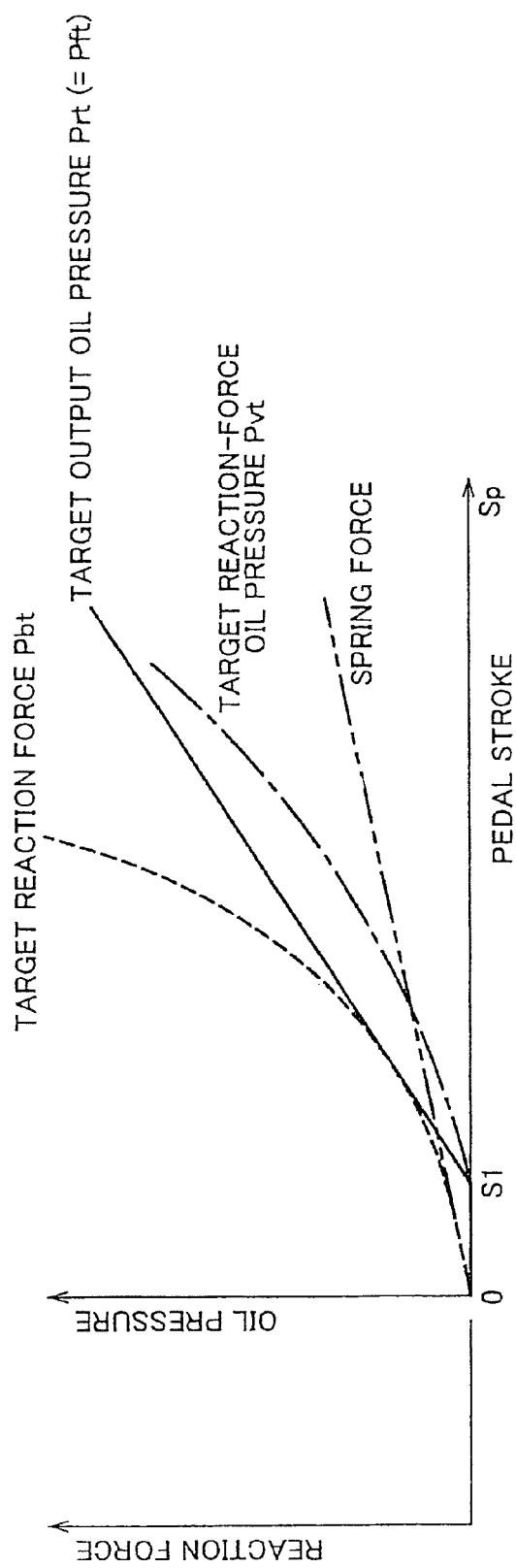
FIG. 2 is a graph indicating target output oil pressure and target reaction force with respect to the pedal stroke in the vehicular brake system of the first embodiment.
Figure 3:
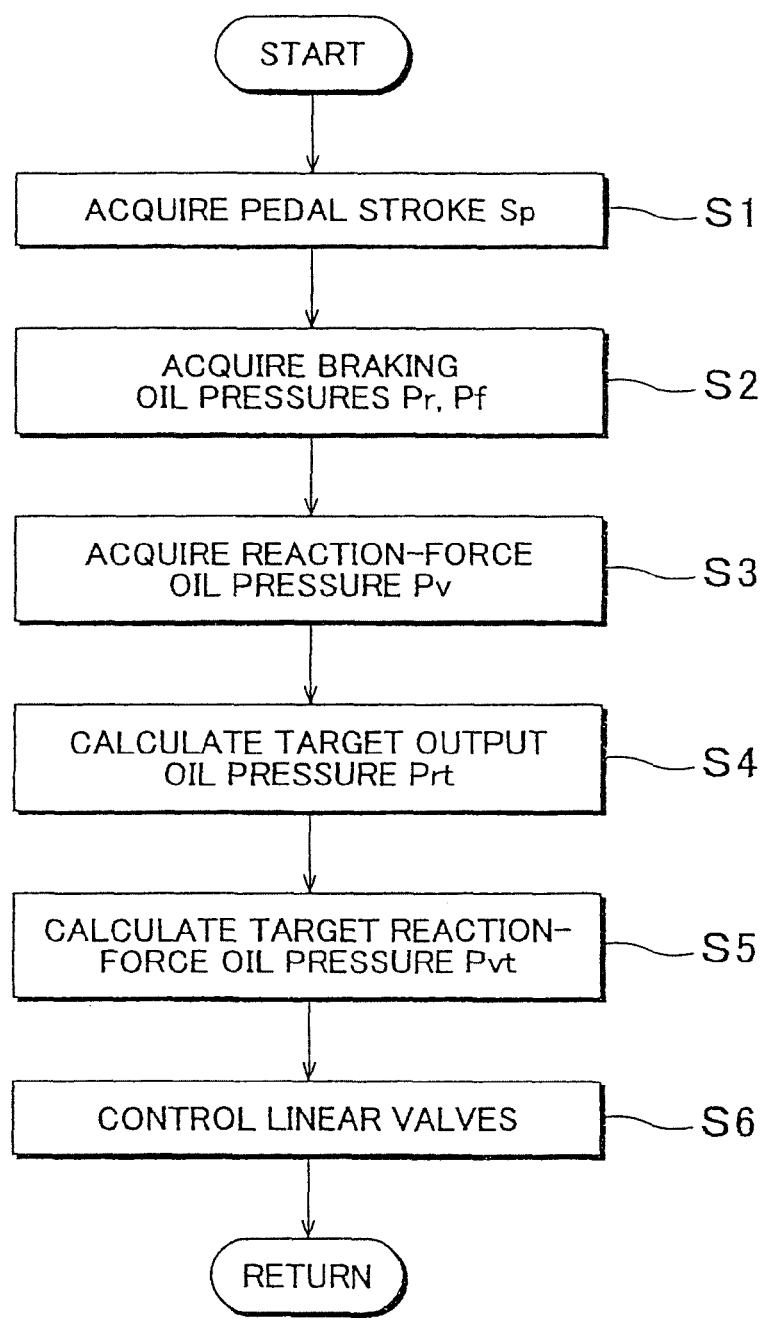
FIG. 3 is a flowchart illustrating braking force control performed by the vehicular brake system of the first embodiment.

FIG. 1 schematically shows a vehicular brake system constructed according to a first embodiment of the invention. FIG. 2 is a graph indicating the target output oil pressure and target reaction force with respect to the pedal stroke in the vehicular brake system of the first embodiment. FIG. 3 is a flowchart illustrating braking force control performed by the vehicular brake system of the first embodiment.

In the vehicular brake system of the first embodiment, a cylinder 11 having a cylindrical shape is provided which is open at its proximal end and is closed at its distal end, as shown in FIG. 1. An input piston 12 and a pressure piston 13 are coaxially disposed in and supported by the cylinder 11 such that the pistons 12, 13 are movable in the axial direction. The input piston 12 is located on one of the axially opposite sides closer to the proximal end of the cylinder 11, and the pressure piston 13 is located on the other side closer to the distal end of the cylinder 11. An operating rod 15 of a brake pedal 14 as an operating device is coupled to a proximal end portion of the input piston 12, such that the input piston 12 can be moved by the brake pedal 14 via the operating rod 15 when the brake pedal 14 is operated by the vehicle operator or driver. Two support members 16, 17 are press-fitted or screwed in the cylinder 11 such that the outer circumferential surfaces of the support members 16, 17 are secured to the inner circumferential surface of the cylinder 11. The input piston 12 is movably supported by the support members 16, 17, and has a disc-shaped flange 18 that is movably supported by the inner circumferential surface of the cylinder 11. The axial movement of the input piston 12 is limited (i.e., the stroke of the input piston 12 is determined) by abutting contacts between the flange 18 and the support members 16, 17, and a reaction-force spring 19 disposed between the support member 16 and the flange 18 urges the flange 18 to contact with the support member 17. Namely, the flange 18 is normally located under the bias force of the spring 19 at the position where the flange 18 is in contact with the support member 17.

The pressure piston 13 has a U-shaped cross section as viewed in the plane of FIG. 1, and is movably supported at its outer circumferential surface by the inner circumferential surface of the cylinder 11. The axial movement of the pressure piston 13 is limited (i.e., the stroke of the pressure piston 13 is determined) by abutting contacts between the front and rear end faces of the pressure piston 13 and the input piston 11 and the support member 16, respectively, and a spring 20 disposed between the pressure piston 13 and the cylinder 11 urges the pressure piston 13 to contact with the support member 16. Namely, the pressure piston 13 is normally located under the bias force of the spring 20 at the position where the piston 13 is in contact with the support member 16. With this arrangement, the input piston 12 and the pressure piston 13 are held apart from each other with a predetermined spacing (stroke) S0 left therebetween. When the driver operates the brake pedal 14 to advance the input piston 12 by the stroke S0, the input piston 12 is brought into contact with and presses the pressure piston 13.

With the input piston 12 and the pressure piston 13 thus coaxially and movably disposed in the cylinder 11, a first pressure chamber R1 is formed on one side of the input piston 12 as viewed in the direction of movement thereof, namely, between the input piston 12 and the pressure piston 13, and a second pressure chamber R2 is formed on the other side of the input piston 12, namely, between the flange 18 of the input piston 12 and the support member 17. Furthermore, a third pressure chamber R3 is formed between the cylinder 11 and the pressure piston 13, and a reaction-force chamber R4 is formed between the support member 16 and the flange 18 of the input piston 12. The first pressure chamber R1 and the second pressure chamber R2 communicate with each other via a communication passage 21 in the form of an orifice formed in the cylinder 11.

A hydraulic pump 22 is adapted to be driven by a motor 23 so as to supply a hydraulic pressure to the hydraulic system of the brake system. The hydraulic pump 22 is connected to a reservoir tank 25 via a line 24, and is connected to an accumulator 27 via a line 26. The accumulator 27 is connected to a first supply port 29 of the communication passage 21 via a first oil pressure supply line 28. A first linear valve 30 is disposed in the first oil pressure supply line 28, and a second linear valve 32 is disposed in a first oil pressure discharge line 31 that connects the first oil pressure supply line 28 with the line 24. The first linear vale 30 and the second linear valve 32 are flow regulating type solenoid valves, and the first linear valve 30 is of a normally closed type while the second linear valve 32 is of a normally open type.

The accumulator 27 is also connected to a second supply port 34 that communicates with the reaction-force chamber R4, via a second oil pressure supply line 33. A third linear valve 35 is disposed in the second oil pressure supply line 33, and a fourth linear valve 37 is disposed in a second oil pressure discharge line 36 that connects the second oil pressure supply line 33 with the first oil pressure discharge line 31. A check valve 38, which bypasses the fourth linear valve 37, is also disposed in the second oil pressure discharge line 36. The third linear valve 35 and the fourth linear valve 37 are flow regulating type solenoid valves, and the second linear valve 35 is of a normally closed type while the fourth linear valve 37 is of a normally open type.

In the meantime, wheel cylinders 39FR, 39FL, 39RR and 39RL for actuating respective brake devices (not shown) are provided in the front wheels FR, FL and rear wheels RR, RL, respectively, and are adapted to be operated by an ABS (anti-lock brake system) 40. A first oil pressure delivery line 42 is connected to a first delivery port 41 in the form of an orifice that communicates with the second pressure chamber R2. The first oil pressure delivery line 42 is connected to the ABS 40, and is capable of supplying hydraulic pressure to the wheel cylinders 39RR, 39RL of the rear wheels RR, RL. A second oil pressure delivery line 44 is connected to a second delivery port 43 in the form of an orifice that communicates with the third pressure chamber R3. The second oil pressure delivery line 44 is connected to the ABS 40, and is capable of supplying hydraulic pressure to the wheel cylinders 39FR, 39FL of the front wheels FR, FL. Furthermore, an oil pressure discharge line 47 connects the reservoir tank 25 with first and second discharge ports 45, 46 that communicate with the third pressure chamber R3.

O rings 48 and one-way seals 49 are mounted in appropriate portions of the cylinder 11, input piston 12, pressure piston 13 and other components so as to prevent leakage of the hydraulic oil.

In the vehicular brake system of the first embodiment constructed as described above, an electronic control unit (ECU) 51 (serving as a control oil pressure setting means) sets a control oil pressure in accordance with an amount of operation of the brake pedal 14 (i.e., the pedal stroke) received by the input piston 12. The brake system also includes an oil pressure supplying means for applying the thus set control oil pressure to the pressure piston 13 so as to produce braking oil pressures. The braking oil pressures thus produced are supplied to the ABS 40, which in turn actuates the wheel cylinders 39FR, 39FL, 39RR, 39RL to apply the braking forces to the front wheels FR, FL and rear wheels RR, RL. In the present embodiments, the control oil pressure is supplied to the first pressure chamber R1 and second pressure chamber R2 of the input piston 13 so as to be applied to the pressure piston 13, to thereby create the braking oil pressures.

In the first embodiment, an operating force absorbing means is provided for absorbing the operating force applied from the brake pedal 14 to the input piston 12, so that the force with which the input piston 12 is pressed is not transmitted to the pressure piston 13 and the same force does not act as reaction force which would otherwise be applied to the brake pedal 14 in response to the operation thereof. In this embodiment, the operating force absorbing means consists of the communication passage 21 that communicates the first pressure chamber R1 with the second pressure chamber R2, and the predetermined spacing S0 between the input piston 12 and the pressure piston 13. To enable the operating force absorbing means to absorb the operating force, the first pressure-receiving area A2 of the distal end face of the input piston 12 that receives the hydraulic pressure of the first pressure chamber R1 and the second pressure-receiving area A3 of the flange 18 of the input piston 12 that receives the hydraulic pressure of the second pressure chamber R2 are made equal to each other with respect to the cross-sectional area A1 of the bore of the cylinder 11. Upon occurrence of an abnormality, the operating force applied from the brake pedal 14 causes the input piston 12 to directly press the pressure piston 13, to thereby produce the braking oil pressures.

Furthermore, the ECU 51 (serving as a reaction-force setting means) sets reaction force in accordance with the amount of operation of the brake pedal 14 received by the input piston 12, so that the reaction force thus set is applied to the input piston 12 and is exerted on the brake pedal 14 (reaction-force supplying means, reaction-force generating means). Upon occurrence of an abnormality, the reaction force applied to the brake pedal 14 is restricted (reaction-force restricting means), so that the brake pedal 14 is prevented from being inoperable.

More specifically, the brake pedal 14 is provided with a stroke sensor 52 that detects the pedal stroke Sp of the brake pedal 14, a pedal pressure sensor 53 that detects the pedal pressure or pedal effort Fp with which the brake pedal 14 is depressed, a pedal pressure switch 54 that is switched ON/OFF with reference to a certain pedal pressure, and a stop lamp switch 55 that turns on a stop lamp (not shown) upon detection of the pedal pressure. The results of detection by these sensors and switches 52, 53, 54, 55 are transmitted to the ECU 51. The first oil pressure delivery line 42 and the second oil pressure delivery line 44 are respectively provided with a first pressure sensor 56 that detects the hydraulic pressure in the line 42 and a second pressure sensor 57 that detects the hydraulic pressure in the line 44. More specifically, the first pressure sensor 56 detects a braking oil pressure Pr supplied from the first pressure chamber R1 to the wheel cylinders 39RR, 39RL of the rear wheels RR, RL via the first oil pressure delivery line 42, and transmits the result of detection to the ECU 51. On the other hand, the second pressure sensor 57 detects a braking oil pressure Pf supplied from the third pressure chamber R3 to the wheel cylinders 39FR, 39FL of the front wheels FR, FL via the second oil pressure delivery line 44, and transmits the result of detection to the ECU 51.

Furthermore, a third pressure sensor 58 is provided in the second oil pressure supply line 33 that extends from the accumulator 27 to the second supply port 34, such that the sensor 58 is located downstream of the third linear valve 35.

The third pressure sensor 58 detects a reaction-force oil pressure Pv supplied to the reaction-force chamber R4, and transmits the result of detection to the ECU 51. A fourth pressure sensor 59, which is provided in the line 26 that extends from the accumulator 27, detects a hydraulic pressure Pp supplied from the accumulator 27 to each pressure chamber, and transmits the result of detection to the ECU 51. Wheel speed sensors 60, which are respectively provided in the front wheels FR, FL and rear wheels RR, RL, detect the wheel speeds of the respective wheels, and transmits the detected wheel speeds to the ECU 51.

In operation, the ECU 51 sets a target output oil pressure Prt based on the pedal stroke Sp detected by the stroke sensor 52, as shown in FIG. 2, and adjusts the openings of the first and second linear valves 30, 32 based on the target output oil pressure Prt. The ECU 51 also acquires the braking oil pressure Pr detected by the first pressure sensor 56, and performs feedback-control so that the braking oil pressure Pr becomes equal to the target output oil pressure Prt. In this case, the ECU 51 stores a map of the target output oil pressure Prt with respect to the pedal stroke Sp (as shown in FIG. 2), and controls the first and second linear valves 30, 32 based on this map. The reaction force Pb exerted on the brake pedal 14 is the sum of the spring force of the reaction-force spring 19 and the reaction-force oil pressure Pv applied to the reaction-force chamber R4. The spring force is a constant or fixed value that is determined by the properties of the reaction-force spring 19. Thus, the ECU 51 sets a target reaction-force oil pressure Pvt based on the pedal stroke Sp detected by the stroke sensor 52, and adjusts the openings of the third and fourth linear valves 35, 37 based on the target reaction-force oil pressure Pvt. The ECU 51 also acquires the reaction-force oil pressure Pv detected by the third pressure sensor 58, and performs feedback-control so that the reaction-force oil pressure Pv becomes equal to the target reaction-force oil pressure Pvt. In this case, the ECU 51 stores a map of the target reaction-force oil pressure Pvt with respect to the pedal stroke Sp (as shown in FIG. 2), and controls the third and fourth linear valves 35, 37 based on this map.

Here, the relationships among the braking oil pressures Pf, Pr and the reaction force Fp (reaction-force oil pressure Pv) will be described. The braking oil pressure Pr is set based on the pedal stroke Sp and a function map that is set in advance with respect to the braking oil pressure Pr and the pedal stroke Sp. The braking oil pressure Pf is approximately equal to the braking oil pressure Pr, and Pr=f Sp (f is a function of stroke—oil pressure). The balance of the forces applied to the input piston 12 is expressed as follows:

$$A2 \times Pr + Sp \times k0 + A3 \times Pv = Fp + A3 \times Pr$$

$$Fp = (A2-A3) \times Pr + k0 \times Sp + A3 \times Pv$$

where k0 is spring constant of the reaction-force spring 19. If the assembly of the cylinder 11, input piston 12 and the pressure piston 13 is designed such that the area A2 is equal to the area A3, the reaction force is expressed as follows:

$$Fp = k0 \times Sp + A3 \times Pv$$

The area A3 is a fixed value, and, therefore, the pedal pressure Fp is determined by the reaction force Pv. It is thus possible to vary the pedal pressure Fp by controlling the reaction force Pv, and set the relationships among the pedal pressure Fp, pedal stroke Sp and the braking oil pressures Pf, Pr as desired.

In the following, braking force control performed by the vehicular brake system of the first embodiment will be described with reference to the flowchart of FIG. 3. In the braking force control, the ECU 51 acquires the pedal stroke Sp detected by the stroke sensor 52 in step S1, acquires the braking oil pressure Pr detected by the first pressure sensor 56 and the braking oil pressure Pf detected by the second pressure sensor 57 in step S2, and acquires the reaction-force oil pressure Pv detected by the third pressure sensor 58 in step S3, as shown in FIG. 3.

Subsequently, the ECU 51 calculates the target output oil pressure Prt using the map set in advance based on the pedal stroke Sp in step S4, and calculates the target reaction-force oil pressure Pvt using the map set in advance based on the pedal stroke Sp in step S5. In step S6, the ECU 51 adjusts the openings of the first and second linear valves 30, 32 based on the calculated target output oil pressure Prt, and adjusts the openings of the third and fourth linear valves 35, 37 based on the calculated target reaction-force oil pressure Pvt. In this step, the ECU 51 controls the braking oil pressure Pr in a feedback fashion so that the braking oil pressure Pr becomes equal to the target output oil pressure Prt, and controls the reaction-force oil pressure Pv in a feedback fashion so that the reaction-force oil pressure Pv becomes equal to the target reaction-force oil pressure Pvt.

More specifically described with reference to FIG. 1, when the driver depresses the brake pedal 14, the input piston 12 moves forward (i.e., moves leftward as viewed in FIG. 1) due to the operating force applied to the brake pedal 14. While the input piston 12 moves forward at this time, the input piston 12 does not directly press the pressure piston 13 because the predetermined spacing S0 is provided between the input piston 12 and the pressure piston 13. With the input piston 12 thus advanced, the hydraulic oil in the first pressure chamber R1 flows into the second pressure chamber R2 through the communication passage 21 so that the input piston 12 is brought into a free condition and the hydraulic oil in the first pressure chamber R1 does not cause the reaction force to be applied to the brake pedal 14 via the input piston 12.

When the driver depresses the brake pedal 14 and the input piston 12 moves forward, the stroke sensor 52 detects the pedal stroke Sp, and the ECU 51 sets the target output oil pressure Prt and the target reaction-force oil pressure Pvt based on the detected pedal stroke Sp. The ECU 51 then adjusts the openings of the first and second linear valves 30, 32 based on the target output oil pressure Prt, and causes a certain control oil pressure to be applied to the first pressure chamber R1. With the control oil pressure thus produced, a certain braking oil pressure Pr is applied from the first pressure chamber R1 to the first oil pressure delivery line 42, and a certain braking oil pressure Pf is applied from the third pressure chamber R3 to the second oil pressure delivery line 44. The braking oil pressures Pr, Pf are then applied to the wheel cylinders 39FR, 39FL, 39RR and 39RL via the ABS 40, so that braking forces commensurate with the operating force applied to the brake pedal 14 by the driver are generated in the front wheels FR, FL and the rear wheels RR, RL.

When the input piston 12 moves forward under the operating force of the brake pedal 14, and a certain control oil pressure is applied to the first pressure chamber R1, the pressure piston 13 moves to shut off the first and second discharge ports 45, 46, to thereby raise the pressure in the third pressure chamber R3. Thus, the oil pressures in the first pressure chamber R1 and the third pressure chamber R3 are balanced in accordance with the control oil pressure applied to the first pressure chamber R1, whereby the braking oil pressures Pr, Pf delivered from these pressure chambers R1, R3 are made substantially equal to each other.

The ECU 51 adjusts the openings of the third and fourth linear valves 35, 37 based on the target reaction-force oil pressure Pvt, and applies a certain reaction-force oil pressure to the reaction-force chamber R4. As a result, the reaction force Pb, which is the sum of the reaction-force oil pressure and the spring force of the reaction-force spring 19, is applied to the reaction-force chamber R4, and is transmitted to the brake pedal 14 via the input piston 12. In this manner, the reaction force commensurate with the operating force of the brake pedal 14 can be exerted on the driver.

When the driver depresses the brake pedal 14 in the case where an abnormality arises in the hydraulic system that applies reaction force to the brake pedal 14, the input piston 12 moves forward by the predetermined stroke S0, and is then brought into contact with the pressure piston 13. Then, the distal end portion of the input piston 12 directly presses the pressure piston 13 so that certain braking oil pressures Pr, Pf are applied to the wheel cylinders 39FR, 39FL, 39RR, 39RL via the ABS 40. In this case, the hydraulic oil in the reaction-force chamber R4 is discharged into the reservoir tank 26 through the second oil pressure supply line 33 and the fourth linear valve 37 that functions as a reaction-force restricting device. With the reaction force thus restricted, the brake pedal 14 is prevented from being inoperable, or the force with which the brake pedal 14 is operated does not become excessively large.

In the vehicular brake system of the first embodiment as described above, the input piston 12 and the pressure piston 13 are coaxially supported in the cylinder 11 such that the pistons 12, 13 are movable in the axial direction, and the brake pedal 14 is coupled to the input piston 12. The pressure chambers R1, R2 formed on the axially opposite sides of the input piston 12 communicate with each other via the communication passage 21. In operation, a control oil pressure is supplied to the first supply port 29 of the communication passage 21, and a reaction-force oil pressure is supplied to the second supply port 34 of the reaction-force chamber R4 of the input piston 12, while the braking oil pressures are delivered from the delivery ports 41, 43 of the first and third pressure chambers R1, R3.

With the brake system constructed as described above, the ECU 51 sets the target output oil pressure Prt in accordance with the pedal stroke Sp, and causes a control oil pressure to be applied to the first pressure chamber R1 based on the target output oil pressure Prt, so that a certain braking oil pressure Pr is delivered from the first pressure chamber R1 into the first oil pressure delivery line 42 while a certain braking oil pressure Pf is delivered from the third pressure chamber R3 into the second oil pressure delivery line 44. The braking oil pressures Pr, Pf thus delivered are applied to the respective wheel cylinders 39FR, 39FL, 39RR, 39RL via the ABS 40, so that appropriate braking forces commensurate with the operating force applied to the brake pedal 14 by the driver can be generated in the front wheels FR, FL and rear wheels RR, RL.

When the input piston 12 moves forward in response to the operation of the brake pedal 14, the hydraulic oil in the first pressure chamber R1 flows into the second pressure chamber R2 through the communication passage 21, and, therefore, the input piston 12 does not receive the control oil pressure. In this condition, the ECU 51 sets the target reaction-force oil pressure Pvt in accordance with the pedal stroke Sp, and causes a certain reaction-force oil pressure to be applied to the reaction-force chamber R4 based on the target reaction-force oil pressure Pvt, so that the reaction force Pb, which is the sum of the reaction-force oil pressure and the spring force of the reaction-force spring 19, is transmitted to the brake pedal 14 via the input piston 12. Thus, appropriate reaction force commensurate with the operating force of the brake pedal 14 can be exerted on the driver.

Upon occurrence of an abnormality, the input piston 12 directly presses the pressure piston 13 depending upon the amount of operation of the brake pedal 14 by the driver, so as to produce braking oil pressures, thus assuring improved safety.

In the vehicular brake system of the first embodiment as described above, braking oil pressures commensurate with the amount of operation of the brake pedal 14 by the driver can be generated with high reliability, and reaction force commensurate with the operating force applied to the brake pedal 14 can be appropriately exerted on the driver. While the brake system of this embodiment is simple in construction, owing to its simplified hydraulic system or oil channels, and can be manufactured at reduced cost, the brake system is capable of performing appropriate braking force control and reaction force control, as described above.

In the vehicular brake system of the first embodiment, the operating force absorbing means consists of the communication passage 21 that communicates with the pressure chambers R1, R2 and the predetermined spacing S0 between the input piston 12 and the pressure piston 13. Thus, the brake system is able to suppress or restrict variations in the reaction force applied to the brake pedal 14 with a simple arrangement. In this case, the first pressure-receiving area A2 of the input piston 12 which receives the hydraulic pressure of the first pressure chamber R1 and the second pressure-receiving area A3 of the flange 18 of the input piston 12 which receives the hydraulic pressure of the second pressure chamber R2 are set to be equal to each other, so that the operating force applied from the brake pedal 14 to the input piston 12 can be surely absorbed.

Furthermore, the communication passage 21 that communicates with the first and second pressure chambers R1 R2 and the first and second delivery ports 41, 43 that deliver the braking oil pressures take the form of orifices. With this arrangement, the force corresponding to the operating speed of the brake pedal 14 is transmitted as reaction force to the input piston 12, thus assuring improved operating comfort for the driver.

Second Embodiment

Figure 4:
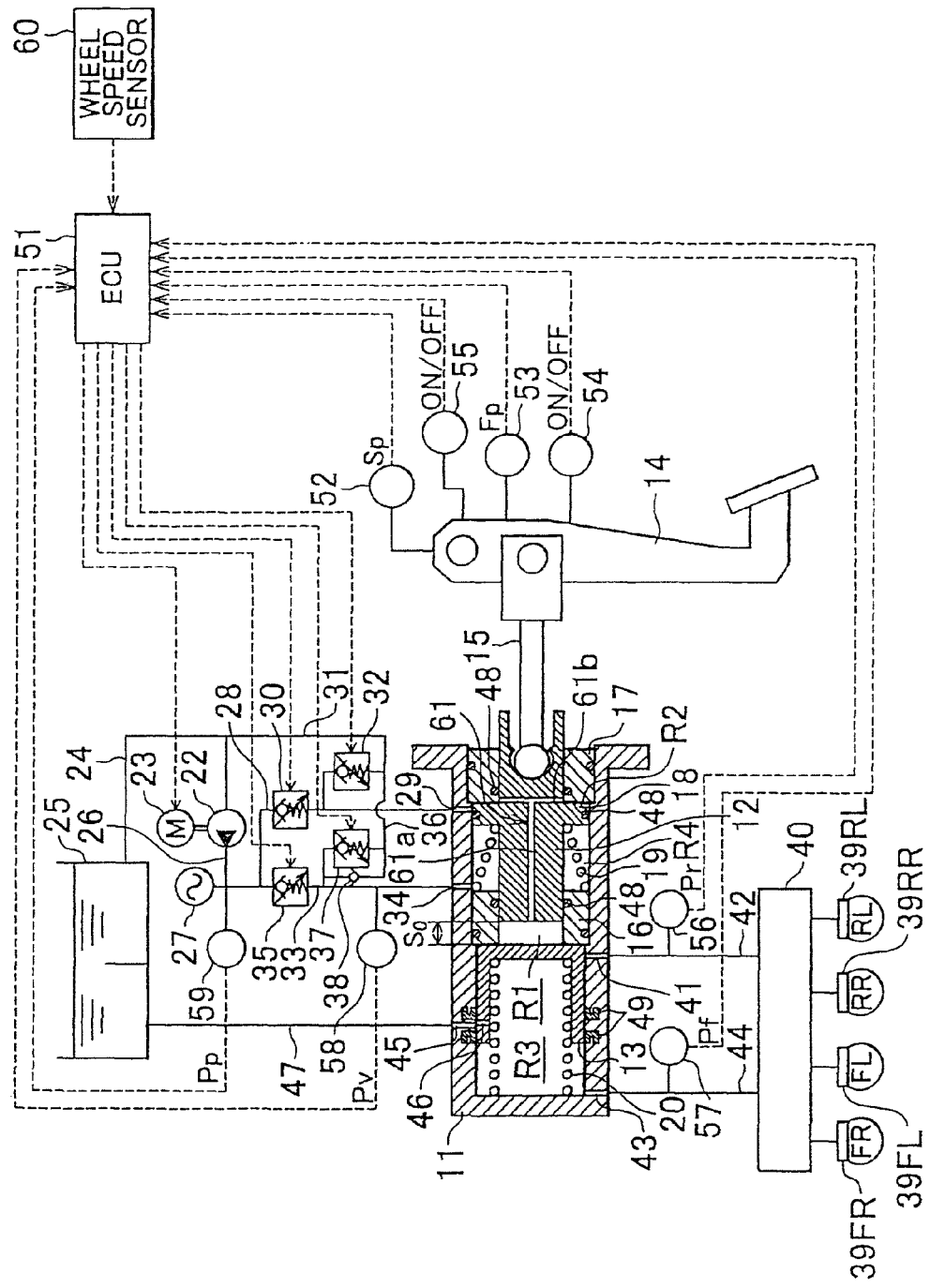
FIG. 4 is a schematic view showing a vehicular brake system constructed according to a second embodiment of the invention.

FIG. 4 schematically shows a vehicular brake system constructed according to a second embodiment of the invention. In FIG. 4, the same reference numerals as used in FIG. 1 are used for identifying structurally and/or functionally corresponding elements, of which detailed description will not be provided.

In the vehicular brake system of the second embodiment, an input piston 12 and a pressure piston 13 are arranged in series and movably supported in a cylinder 11, and an operating rod 15 of a brake pedal 14 is coupled to the input piston 12, as shown in FIG. 4. The input piston 12 has a flange 18 that is held in contact with a support member 17 under bias force of a reaction-force spring 19. On the other hand, the pressure piston 13 is held in contact with a support member 16 under bias force of a spring 20. The pressure piston 13 and the input piston 12 are held apart from each other with a predetermined spacing (stroke) S0 left therebetween.

In the cylinder 11, a first pressure chamber R1 is formed between the input piston 12 and the pressure piston 13, and a second pressure chamber R2 is formed between the flange 18 of the input piston 12 and the support member 17, while a third pressure chamber R3 is formed between the cylinder 11 and the pressure piston 13, and a reaction-force chamber R4 is formed between the support member 16 and the flange 18 of the input piston 12. The first pressure chamber R1 and the second pressure chamber R2 communicate with each other through a communication passage 61 in the form of an orifice formed in the input piston 12.

In the second embodiment, the communication passage 61 that communicates the first pressure chamber R1 with the second pressure chamber R2 is formed within the input piston 12. The communication passage 61 consists of a first hole 61a formed along the axis of the input piston 12, and a second hole 61b formed in radial directions of the piston 12 to communicate with the first hole 61a.

A first oil pressure supply line 28 that extends from an accumulator 27 is connected to a first supply port 29 of the communication passage 61, and a first linear valve 30 is disposed in the first oil pressure supply line 28 while a second linear valve 32 is disposed in a first oil pressure discharge line 31 connected to the first oil pressure supply line 28. A second oil pressure supply line 33 that extends from the accumulator 27 is connected to a second support port 34 of the reaction-force chamber R4, and a third linear valve 35 is disposed in the second oil pressure supply line 33 while a fourth linear valve 37 is disposed in a second oil pressure discharge line 36 connected to the second oil pressure supply line 33.

In the meantime, a first delivery port 41 of the second pressure chamber R2 is connected to the ABS 40 via a first oil pressure delivery line 42 such that hydraulic pressure can be supplied to the wheel cylinders 39RR, 39RL of the rear wheels RR, RL. A second delivery port 43 of the third pressure chamber R3 is connected to the ABS 40 via a second oil pressure delivery line 44 such that hydraulic pressure can be supplied to the wheel cylinders 39FR, 39FL of the front wheels FR, FL. Furthermore, first and second discharge ports 45, 46 of the third pressure chamber R3 are connected to a reservoir tank 25 via an oil pressure discharge line 47.

The brake pedal 14 is provided with a stroke sensor 52, a pedal pressure sensor 53, a pedal pressure switch 54 and a stop lamp switch 55, which transmit the results of detection to the ECU 51. The first and second oil pressure delivery lines 42, 44 are respectively provided with first and second pressure sensors 56, 57, which transmit the results of detection to the ECU 51. Furthermore, the second oil pressure supply line 33 is provided with a third pressure sensor 58, and a line 26 that extends from the accumulator 27 is provided with a fourth pressure sensor 59. The third and fourth pressure sensors 58, 59 transmit the results of detection to the ECU 51.

With the brake system thus constructed, the ECU 51 sets a target output oil pressure Prt based on the pedal stroke Sp detected by the stroke sensor 52, and adjusts the openings of the first and second linear valves 30, 32. The ECU 51 also acquires the braking oil pressure Pr detected by the first pressure sensor 56, and performs feedback control so that the braking oil pressure Pr becomes equal to the target output oil pressure Prt. The ECU 51 sets a target reaction-force oil pressure Pvt based on the pedal stroke Sp detected by the stroke sensor 52, and adjusts the openings of the third and fourth linear valves 35, 37. The ECU 51 also acquires the reaction-force oil pressure Pv detected by the third pressure sensor 58, and performs feedback control so that the reaction-force oil pressure Pv becomes equal to the target reaction-force oil pressure Pvt.

Hydraulic control performed by the vehicular brake system of the second embodiment is substantially the same as that of the first embodiment as described above, and, therefore, will not be explained herein.

In the vehicular brake system of the second embodiment, the input piston 12 and the pressure piston 13 are coaxially supported in the cylinder 11 such that the pistons 12, 13 are movable in the axial direction, and the brake pedal 14 is coupled to the input piston 12. The two pressure chambers R1, R2 communicate with each other via the communication passage 61 formed within the input piston 12, and a control oil pressure can be supplied to the first supply port 29 of the communication passage 61. Furthermore, a reaction-force oil pressure can be supplied to the second support port 34 of the reaction-force chamber R4, and braking oil pressures can be delivered from the delivery ports 41, 43 of the first and third pressure chambers R1, R3.

With the above-described arrangement, the ECU 51 causes a control oil pressure to be applied to the first pressure chamber R1 based on the target output oil pressure Prt so that a certain braking oil pressure Pr is delivered from the first pressure chamber R1 while a certain braking oil pressure Pf is delivered from the third pressure chamber R3. In this manner, appropriate braking force commensurate with the operating force applied to the brake pedal 14 by the driver can be generated in each wheel. When the input piston 12 moves forward in response to the operation of the brake pedal 14, the hydraulic oil in the first pressure chamber R1 flows into the second pressure chamber R2 through the communication passage 61, and, therefore, the input piston 12 does not receive the control oil pressure. The ECU 51 also causes a reaction-force oil pressure to be applied to the reaction-force chamber R4 based on the target reaction-force oil pressure Pvt, so that the reaction force Pb is transmitted to the brake pedal 14 via the input piston 12. Thus, appropriate reaction force corresponding to the operating force of the brake pedal 14 can be exerted on the driver.

In the vehicular brake system of the second embodiment, the communication passage 61 that communicates with the first pressure chamber R1 and the second pressure chamber R2 consists of the first hole 61a formed along the axis of the input piston 12, and the second hole 61b formed in the radial directions of the piston 12 to communicate with the first hole 61a. Thus, the communication passage 61 can be formed simply by boring the first hole 61 and second hole 61b in the input piston 12, which leads to simplified manufacturing operations or steps and reduced manufacturing cost.

Third Embodiment

Figure 5:
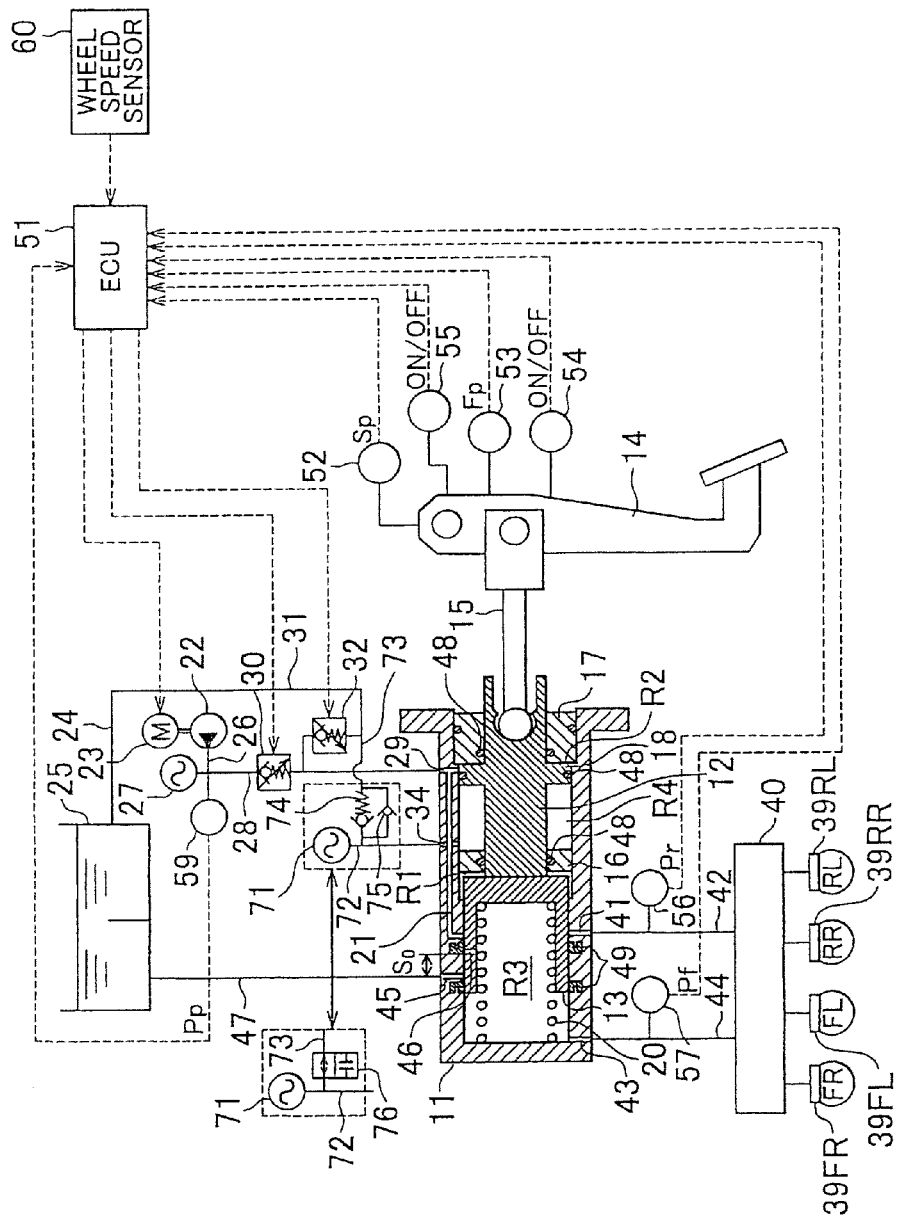
FIG. 5 is a schematic view showing a vehicular brake system constructed according to a third embodiment of the invention.

FIG. 5 schematically shows a vehicular brake system constructed according to a third embodiment of the invention. In FIG. 5, the same reference numerals as used in the previous embodiments are used for identifying structurally and/or functionally corresponding elements, of which detailed description will not be provided.

In the vehicular brake system of the third embodiment, an input piston 12 and a pressure piston 13 are arranged in series and movably supported in a cylinder 11, and an operating rod 15 of a brake pedal 14 is coupled to the input piston 12, as shown in FIG. 5. The pressure piston 13 is urged by a spring 20 to be held in contact with the input piston 12. In the cylinder 11, a first pressure chamber R1 is formed between the input piston 12 and the pressure piston 13, and a second pressure chamber R2 is formed between a flange 18 of the input piston 12 and a support member 17, while a third pressure chamber R3 is formed between the cylinder 11 and the pressure piston 13, and a reaction-force chamber R4 is formed between a support member 16 and the flange 18 of the input piston 12. The first pressure chamber R1 communicates with the second pressure chamber R2 via a communication passage 21.

A first oil pressure supply line 28 that extends from an accumulator 27 is connected to a first supply port 29 of the communication passage 21, and a first linear valve 30 is disposed in the first oil pressure supply line 28 while a second linear valve 32 is disposed in a first oil pressure discharge line 31 connected to the first oil pressure supply line 28. A second oil pressure supply line 72 that extends from an accumulator 71 having a smaller capacity than the accumulator 27 is connected to a second supply port 34 of the reaction-force chamber R4, and a relief valve 74 is disposed in a second oil pressure discharge line 73 that connects the second oil pressure supply line 72 with the first oil pressure discharge line 31. A check valve 75, which bypasses the relief valve 74, is also disposed in the second oil pressure discharge line 73. In this embodiment, the accumulator 71, second oil pressure supply line 72, second oil pressure discharge line 73 and the relief valve 74 constitute a reaction-force restricting means.

It is to be understood that the reaction-force restricting means is not limited to the above-described construction or arrangement, but may consist of the accumulator 71, second oil pressure supply line 72, second oil pressure discharge line 73 and a solenoid-operated valve 76.

In the meantime, a first discharge port 41 of the second pressure chamber R2 is connected to an ABS 40 via a first oil pressure delivery line 42, and a second delivery port 43 of the third pressure chamber R3 is connected to the ABS 40 via a second oil pressure delivery line 44. Furthermore, first and second discharge ports 45, 46 of the third pressure chamber R3 are connected to a reservoir tank 25 via an oil pressure discharge line 47. In the condition where the pressure piston 13 is urged by the spring 20 to be held in contact with the input piston 12, the first and second discharge ports 45, 46 communicate with each other with a pair of one-way seals 49 provided therebetween.

When the operating force of the brake pedal 14 causes the input piston 12 to move forward and press the pressure piston 13, the hydraulic oil in the first pressure chamber R1 flows into the second pressure chamber R2 through the communication passage 21, and, therefore, the reaction force does not act on the brake pedal 14. Since the hydraulic oil in the third pressure chamber R3 flows into the reservoir tank 25 through the oil pressure discharge line 47 until the pressure piston 13 moves by the stroke S0 to shut off the first and second discharge ports 45, 46, the operating force applied to the input piston 12 is absorbed, and no control oil pressure is generated. When the pressure piston 13 then moves by a distance equal to or larger than the stroke S0 to shut off the first and second discharge ports 45, 46, and a certain control oil pressure is applied to the first pressure chamber R1, the hydraulic pressures in the first and third pressure chambers R1, R3 are raised and balanced with each other, so that equivalent braking oil pressures Pr, Pf are delivered from the first and third pressure chambers R1, R3.

The brake pedal 14 is provided with a stroke sensor 52, a pedal pressure sensor 53, a pedal pressure switch 54 and a stop lamp switch 55, which transmit the results of detection to the ECU 51. The first and second oil pressure delivery lines 42, 44 are respectively provided with first and second pressure sensors 56, 57, which transmit the results of detection to the ECU 51. Furthermore, a line 26 that extends from the accumulator 27 is provided with a fourth pressure sensor 59, which transmits the result of detection to the ECU 51.

In operation, the ECU 51 sets a target output oil pressure Prt based on the pedal stroke Sp detected by the stroke sensor 52, and adjusts the openings of the first and second linear valves 30, 32. The ECU 51 also acquires the braking oil pressure Pr detected by the first pressure sensor 56, and performs feedback control so that the braking oil pressure Pr becomes equal to the target output oil pressure Prt.

In the vehicular brake system of the third embodiment constructed as described above, when the driver depresses the brake pedal 14 and the input piston 12 moves forward under the operating force of the brake pedal 14, the hydraulic oil in the first pressure chamber R1 flows into the second pressure chamber R2 through the communication passage 21, and, therefore, no reaction force acts on the brake pedal 14. When the pressure piston 13 moves forward along with the input piston 12 upon depression of the brake pedal 14, the hydraulic oil in the third pressure chamber R3 flows into the reservoir tank 25 through the first and second discharge ports 45, 46, and, therefore, no control oil pressure is generated.

When the input piston 12 and the pressure piston 13 further move by a distance equal to or larger than the stroke S0, the ECU 51 sets a target output oil pressure Prt based on the pedal stroke Sp. The ECU 51 then adjusts the openings of the first and second linear valves 30, 32 based on the target output oil pressure Prt, and causes a certain control oil pressure to be applied to the first pressure chamber R1. With the control oil pressure thus applied, a certain braking oil pressure Pr is applied from the first pressure chamber R1 to the first oil pressure delivery line 42, and a certain braking oil pressure Pf is applied from the third pressure chamber R3 to the second oil pressure delivery line 44. The braking oil pressures Pr, Pf are then applied to the wheel cylinders 39FR, 39FL, 39RR, 39RL via the ABS 40, so that braking forces commensurate with the operating force applied to the brake pedal 14 by the driver can be generated in the front wheels FR, FL and rear wheels RR, RL.

The hydraulic pressure of the accumulator 71 is constantly applied to the reaction-force chamber R4 through the second oil pressure supply line 72. When the input piston 12 moves in response to the operation of the brake pedal 14, the pressure in the reaction-force chamber R4 is raised so as to increase the reaction force Pb in the chamber R4. The reaction force Pb is then transmitted to the brake pedal 14 via the input piston 12, so that appropriate reaction force commensurate with the operating force of the brake pedal 14 can be exerted on the driver.

In the case where an abnormality arises in a hydraulic system that applies reaction force to the brake pedal 14, the input piston 12 directly presses the pressure piston 13 upon depression of the brake pedal 14 by the driver, and certain braking oil pressures Pr, Pf can be applied to the wheel cylinders 39FR, 39FL, 39RR, 39RL via the ABS 40. In this case, the hydraulic oil in the reaction-force chamber R4 is discharged into the reservoir tank 25 through the second oil pressure supply line 72 and the relief valve 74 or solenoid-operated valve 76, so as to prevent the brake pedal 14 from being inoperable or from being operated with excessively large force.

In the vehicular brake system of the third embodiment, the input piston 12 and the pressure piston 13 are coaxially supported in the cylinder 11 such that the pistons 12, 13 that are held in contact with each other are movable in the axial direction, and the brake pedal 14 is coupled to the input piston 12. The first and second pressure chambers R1, R2 communicate with each other through the communication passage 21. With this arrangement, a control oil pressure can be supplied to the first supply port 29 of the communication passage 21, and a reaction-force oil pressure can be supplied to the second supply port 34 of the reaction-force chamber R4 of the input piston 12, while braking oil pressures can be delivered from the delivery ports 41, 43 of the first and third pressure chambers R1, R3.

In operation, the ECU 51 causes a control oil pressure to be applied to the first pressure chamber R1 based on the target output oil pressure Prt, to thereby deliver a certain braking oil pressure Pr from the first pressure chamber R1 and deliver a certain braking oil pressure Pf from the third pressure chamber R3, so that appropriate braking force commensurate with the operating force applied to the brake pedal 14 by the driver can be generated in each wheel. When the input piston 12 moves forward in response to the operation of the brake pedal 14, the hydraulic oil in the first pressure chamber R1 flows into the second pressure chamber R2 via the communication passage 21, and, therefore, the input piston 12 does not receive the control oil pressure. The ECU 51 also causes a certain reaction-force oil pressure to be applied to the reaction-force chamber R4 based on the target reaction-force oil pressure Pvt, so as to transmit reaction force Pb to the brake pedal 14 via the input piston 12. Thus, appropriate reaction force commensurate with the operating force of the brake pedal 14 can be exerted on the driver.

In the vehicular brake system of the third embodiment in which the input piston 12 and the pressure piston 13 are held in contact with each other, when the input piston 12 and the pressure piston 13 move forward due to the operating force of the brake pedal 14, the hydraulic oil in the third pressure chamber R3 is discharged into the reservoir tank 25 until the pressure piston 13 moves by the stroke S0 to shut off the first and second discharge ports 45, 46.

Since the hydraulic oil in the third pressure chamber R3 is discharged into the reservoir tank 25 during a period from the depression of the brake pedal 14 by the driver to the time when the input piston 12 and pressure piston 13 move by a distance equal to or larger than the stroke S0, no braking oil pressure is produced during this period, and reaction force corresponding to the braking oil pressure can be prevented from being transmitted from the input piston 12 to the brake pedal 14.

Fourth Embodiment

Figure 6:
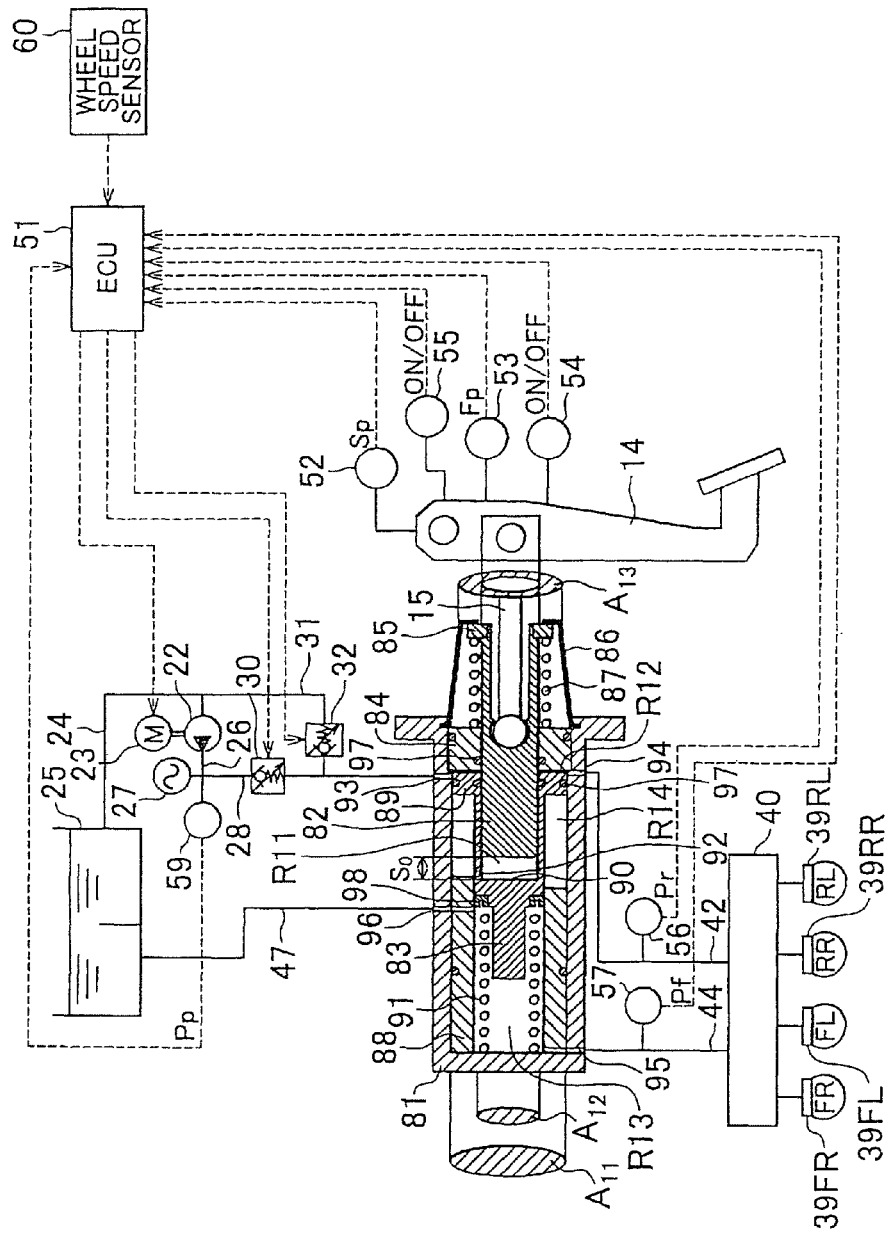
FIG. 6 is a schematic view showing a vehicular brake system constructed according to a fourth embodiment of the invention.

FIG. 6 schematically shows a vehicular brake system constructed according to a fourth embodiment of the invention. In FIG. 6, the same reference numerals as used in the previous embodiments are used for identifying structurally and/or functionally corresponding elements, of which detailed description will not be provided.

In the vehicular brake system of the fourth embodiment, an input piston 82 and a pressure piston 83 are coaxially arranged in a cylinder 81 such that the input piston 82 is partially received in the pressure piston 83 and the input piston 82 and the pressure piston 83 are movable in the axial direction, as shown in FIG. 6. An operating rod 15 of a brake pedal 14 is coupled to the input piston 82. A support member 84 is press-fitted or screwed in the cylinder 81 such that the outer circumferential surface of the support member 84 is fixed to the inner circumferential surface of the cylinder 81. The input piston 82 is movably supported by the support member 84, and the axial movement of the input piston 82 is limited (i.e., the stroke of the input piston 82 is determined) by abutting contact of its flange 85 with a case 86 that is secured to the cylinder 81. The flange 85 of the input piston 82 is urged by a reaction-force spring 87 mounted between the support member 84 and the case 86 to be held in contact with the case 86.

A support member 88 is press-fitted or screwed in the cylinder 81 such that the outer circumferential surface of the support member 88 is fixed to the inner circumferential surface of the cylinder 81. The pressure piston 83 is movably supported by the support member 88, and its flange 89 is movably supported by the inner circumferential surface of the cylinder 81. The pressure piston 83 has a hollow portion 90 in which a distal end portion of the input piston 82 is received. The axial movement of the pressure piston 83 is limited (i.e., the stroke of the pressure piston 83 is determined) by abutting contact of its distal end portion with the cylinder 81 and abutting contact of the flange 89 with the support member 84. The pressure piston 83 is urged by a spring 91 mounted between the piston 83 and the cylinder 81 to be held in contact with the support member 84. With this arrangement, the distal end face of the input piston 82 and the bottom face of the hollow portion 90 of the pressure piston 83 are held apart from each other by a predetermined spacing (stroke) S0. When the input piston 82 moves forward by the predetermined stroke S0 in response to the operation of the brake pedal 14 by the driver, the input piston 82 abuts on the pressure piston 83 and presses the same piston 83.

In the cylinder 81, a first pressure chamber R11 is formed between the input piston 82 and the pressure piston 83, and a second pressure chamber R12 is formed between the flange 89 of the pressure piston 83 and the support member 84, while a third pressure chamber R13 is formed between the cylinder 81 and the pressure piston 83, and a fourth pressure chamber R14 is formed between the support member 88 and the flange 89 of the pressure piston 83. The first pressure chamber R11 communicates with the fourth pressure chamber R14 via a through hole 92.

A first oil pressure supply line 28 that extends from an accumulator 27 is connected to a supply port 93 of the second pressure chamber R12, and a first linear valve 30 is disposed in the first oil pressure supply line 28 while a second linear valve 32 is disposed in a first oil pressure discharge line 31 connected to the first oil pressure supply line 28. A first delivery port 94 of the second pressure chamber R12 is connected to an ABS 40 via a first oil pressure delivery line 42 so that hydraulic pressure can be supplied to the wheel cylinders 39RR, 39RL of the rear wheels RR, RL. A second delivery port 95 of the third pressure chamber R13 is connected to the ABS 40 via a second oil pressure delivery line 44 so that hydraulic pressure can be supplied to the wheel cylinders 39FR, 39FL of the front wheels FR, FL. Furthermore, a discharge port 96 of the third pressure chamber R13 is connected to a reservoir tank 25 via an oil pressure discharge line 47.

O rings 97 and one-way seals 98 for preventing leakage of the hydraulic oil are mounted in appropriate portions of the cylinder 81, input piston 82, pressure piston 83 and other components.

The brake pedal 14 is provided with a stroke sensor 52, a pedal pressure sensor 53, a pedal pressure switch 54, and a stop lamp switch 55, which transmit the results of detection to an ECU 51. The first and second oil pressure delivery lines 42, 44 are respectively provided with first and second pressure sensors 56, 57, which transmit the results of detection to the ECU 51. Furthermore, a line 26 that extends from the accumulator 27 is provided with a fourth pressure sensor 59, which transmits the result of detection to the ECU 51.

In the vehicular brake system of the fourth embodiment constructed as described above, the ECU 51 sets a target output oil pressure Prt based on the pedal stroke Sp detected by the stroke sensor 52, and adjusts the openings of the first and second linear valves 30, 32. The ECU 51 also acquires the braking oil pressure Pr detected by the first pressure sensor 56, and performs feedback control so that the braking oil pressure Pr becomes equal to the target output oil pressure Prt. In this manner, the brake system is able to generate a braking oil pressure in accordance with the amount of operation of the brake pedal 14 received by the input piston 82.

The brake system of the fourth embodiment includes an operating force absorbing means for absorbing the operating force applied from the brake pedal 14 to the input piston 82, and preventing the pressing force (i.e., the operating force) from being transmitted to the pressure piston 83 and from being applied as reaction force to the brake pedal 14. In this embodiment, the operating force absorbing means consists of the first pressure chamber R11, through hole 92 and the discharge port 96, and the first pressure-receiving area A12 of the distal end face of the input piston 82 that receives the hydraulic pressure of the first pressure chamber R11 and the second pressure-receiving area A13 of the flange 89 of the pressure piston 83 that receives the hydraulic pressure of the second pressure chamber R12 are set to be equal to each other with respect to the cross-sectional area A11 of the bore of the cylinder 81. Upon occurrence of an abnormality, the operating force applied from the brake pedal 14 causes the input piston 82 to directly press the pressure piston 83, to thereby produce braking oil pressures.

More specifically, when the driver depresses the brake pedal 14, the input piston 82 moves forward due to the operating force applied to the brake pedal 14. At this time, the input piston 82 does not directly press the pressure piston 83 since the predetermined spacing S0 is provided between the input piston 82 and the pressure piston 83, and the hydraulic oil of the first pressure chamber R11 flows into the fourth pressure chamber R14 through the through hole 92, and is then discharged into the reservoir tank 25 through the discharge port 96 and the oil pressure discharge line 47. As a result, the input piston 82 is bought into a free condition, and the hydraulic oil in the first pressure chamber R11 does not cause reaction force to be applied to the brake pedal 14 via the input piston 82.

When the input piston 82 moves forward in response to the operating force of the brake pedal 14, and a certain control oil pressure is applied to the second pressure chamber R12, the pressure piston 83 moves forward to shut off the discharge port 96, to thereby raise the pressure in the third pressure chamber R13. By balancing the hydraulic pressure of the third pressure chamber R13 with the control oil pressure applied to the second pressure chamber R12, the braking oil pressures Pr, Pf delivered from these pressure chambers R12, R13 are made substantially equal to each other.

In the case where an abnormality arises in a hydraulic system that applies reaction force to the brake pedal 14, the input piston 82 moves forward by the predetermined stroke S0 upon depression of the brake pedal 14 by the driver, and then the distal end portion of the input piston 82 directly presses the pressure piston 83 so that certain braking oil pressures Pr, Pf are applied to the wheel cylinders 39FR, 39FL, 39RR and 39RL via the ABS 40.

In the vehicular brake system of the fourth embodiment, the input piston 82 and the pressure piston 83 are axially movably supported in the cylinder 81 such that the input piston 82 is partially received in the pressure piston 83, and the brake pedal 14 is coupled to the input piston 82. With this arrangement, a control oil pressure can be supplied to the first supply port 93 of the second pressure chamber R12, and the hydraulic oil of the first pressure chamber R11 can be discharged from the discharge port 96 via the through hole 92 and the fourth pressure chamber R14, while braking oil pressures can be delivered from the delivery ports 94, 95 of the second and third pressure chambers R12, R13.

In operation, the ECU 51 sets a target output oil pressure Prt in accordance with the pedal stroke Sp, and applies a control oil pressure to the second pressure chamber R12 based on the target output oil pressure Prt so that a certain braking oil pressure Pr is delivered from the second pressure chamber R12 to the first oil pressure delivery line 42 while a certain braking oil pressure Pf is delivered from the third pressure chamber R13 to the second oil pressure delivery line 44. The braking oil pressures Pr, Pf are applied to the respective wheel cylinders 39FR, 39FL, 39RR, 39RL via the ABS 40, so that appropriate braking forces corresponding to the operating force applied to the brake pedal 14 by the driver can be generated in the front wheels FR, FL and rear wheels RR, RL.

When the input piston 82 moves forward in response to the operation of the brake pedal 14, the hydraulic oil in the first pressure chamber R11 is discharged from the discharge port 96 through the through hole 92 and the fourth pressure chamber R14, whereby the input piston 82 does not receive the control oil pressure. In this condition, the input piston 82 transmits the spring force of the reaction-force spring 87 as reaction force to the brake pedal 14, so that appropriate reaction force commensurate with the operating force of the brake pedal 14 can be exerted on the driver.

Upon occurrence of an abnormality, the input piston 82 directly presses the pressure piston 83 depending upon the amount of operation of the brake pedal 14 by the driver, so as to generate braking oil pressures, thus assuring improved safety.

As described above, the brake system of the fourth embodiment is able to surely produce braking oil pressures in accordance with the amount of operation of the brake pedal 14 by the driver, and is also able to appropriately exert reaction force commensurate with the operating force of the brake pedal 14 on the driver. While the brake system of this embodiment is simple in construction, owing to its simplified hydraulic system or oil channels, and can be manufactured at reduced cost, the brake system is capable of performing appropriate braking force control and reaction force control, as described above.

In the vehicular brake system of the fourth embodiment, the input piston 82 and the pressure piston 83 are axially movably supported in the cylinder 81 such that the input piston 82 is partially received in the pressure piston 83. Also, the brake system is adapted to absorb the operating force of the brake pedal 14 by discharging the hydraulic oil in the first pressure chamber R11 from the discharge port 96 via the through hole 92 and the fourth pressure chamber R14. The above arrangement in which the input piston 82 is constantly received in the pressure piston 83 make it possible to reduce the overall length of the cylinder 81 and the size of the whole system. In addition, the arrangement in which the input piston 82 is constantly held in contact with the pressure piston 83 prevents occurrence of the sound of collision therebetween.

Fifth Embodiment

Figure 7:
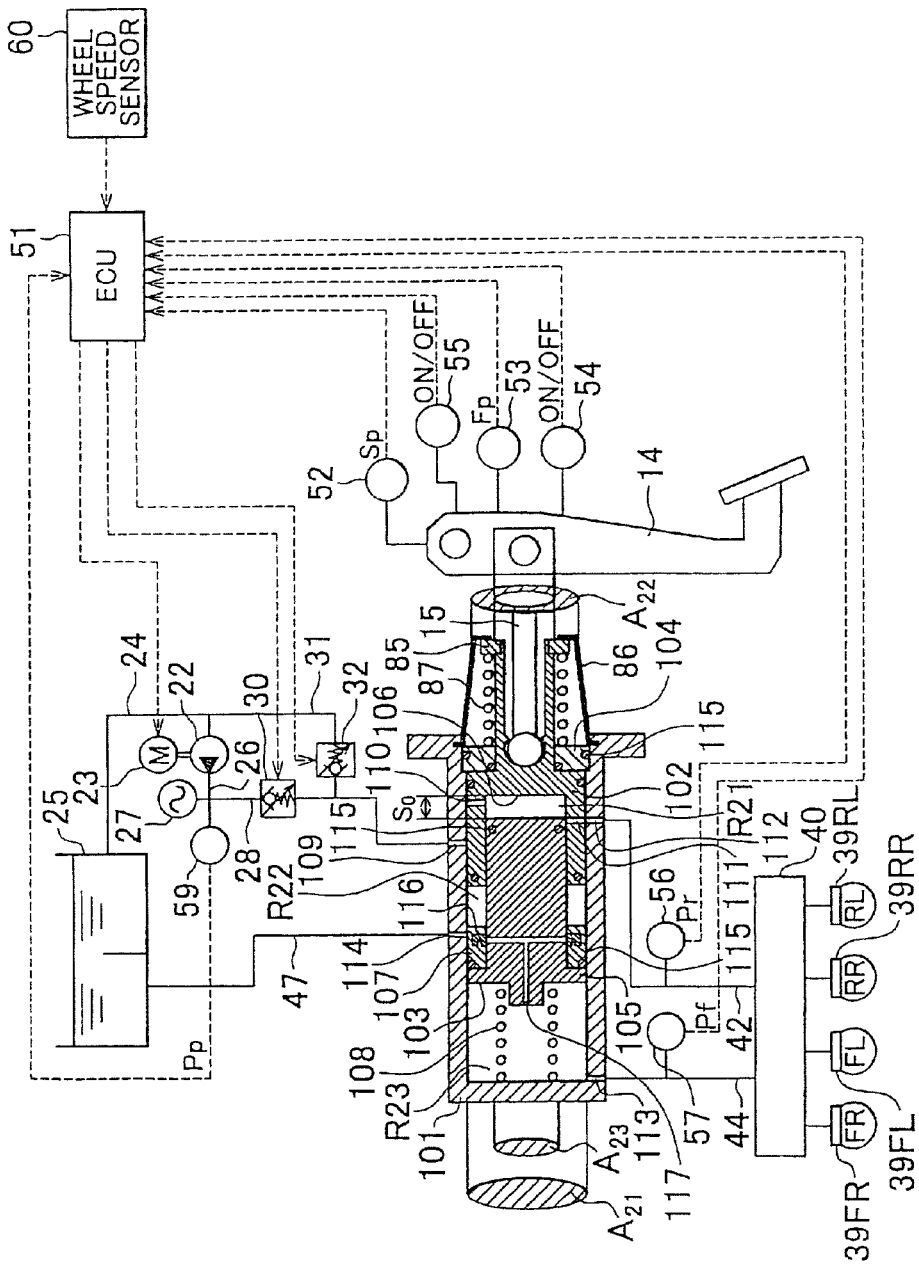
FIG. 7 is a schematic view showing a vehicular brake system constructed according to a fifth embodiment of the invention.

FIG. 7 schematically shows a vehicular brake system constructed according to a fifth embodiment of the invention. In FIG. 7, the same reference numerals as used in the previous embodiments are used for identifying structurally and/or functionally corresponding elements, of which detailed description will not be provided.

In the vehicular brake system of the fifth embodiment, an input piston 102 and a pressure piston 103 are coaxially arranged in a cylinder 101 such that the pressure piston 103 is partially received in the input piston 102, and the input piston 102 and the pressure piston 103 are movable in the axial direction, as shown in FIG. 7. An operating rod 15 of a brake pedal 14 is coupled to the input piston 102. The input piston 102 is movably supported at its outer circumferential surface by the inner circumferential surface of the cylinder 101. The axial movement of the input piston 102 is limited (i.e., the stroke of the input piston 102 is determined) by abutting contact of the input piston 102 with a support member 104 fixed to the cylinder 101. The input piston 102 is urged by a reaction-force spring 87 mounted between the support member 104 and a case 86 to be held in contact with the support member 104.

The pressure piston 103 has a flange 105 that is movably supported by the inner circumferential surface of the cylinder 101. The input piston 102 has a hollow portion 106 in which the proximal end portion of the pressure piston 103 is received. The axial movement of the pressure piston 103 is limited (i.e., the stroke of the pressure piston 103 is determined) by abutting contact of its distal end face with the cylinder 101 and abutting contact of its flange 105 with a support member 107 fixed to the cylinder 101. The pressure piston 103 is urged by a spring 108 mounted between the piston 103 and the cylinder 101 toward the position where the flange 105 is held in contact with the support member 107. With this arrangement, the bottom face of the hollow portion 106 of the input piston 102 is held apart from the proximal end face of the pressure piston 103 by a predetermined spacing (stroke) S0. When the driver operates the brake pedal 14, the input piston 102 moves forward by the stroke S0 to abut on the pressure piston 103, and then presses the same piston 103.

In the cylinder 101, a first pressure chamber R21 is formed between the input piston 102 and the pressure piston 103, and a second pressure chamber R22 is formed between the input piston 102 and the support member 107, while a third pressure chamber R23 is formed between the cylinder 101 and the pressure piston 103.

A first oil pressure supply line 28 that extends from an accumulator 27 is connected to first and second supply ports 109, 110 that lead to the first pressure chamber R21, and a first linear valve 30 is disposed in the first oil pressure supply line 28 while a second linear valve 32 is disposed in a first oil pressure discharge line 31 connected to the first oil pressure supply line 28. First and second delivery ports 111, 112 of the first pressure chamber R21 are connected to an ABS 40 via a first oil pressure delivery line 42, such that hydraulic pressure can be supplied to the wheel cylinders 39RR, 39RL of the rear wheels RR, RL. A third delivery port 113 of the third pressure chamber R23 is connected to the ABS 40 via a second oil pressure delivery line 44, such that hydraulic pressure can be supplied to the wheel cylinders 39FR, 39FL of the front wheels FR, FL. Furthermore, an idle port 117 that communicates the second pressure chamber R22 with the third pressure chamber R23 is formed in the pressure piston 103, and a discharge port 114 of the second pressure chamber R22 is connected to a reservoir tank 25 via an oil pressure discharge line 47.

O rings 115 and one-way seals 116 for preventing leakage of the hydraulic oil are mounted in appropriate portions of the cylinder 101, input piston 102, pressure piston 103 and other components.

The brake pedal 14 is provided with a stroke sensor 52, a pedal pressure sensor 53, a pedal pressure switch 54, and a stop lamp switch 55, which transmit the results of detection to an ECU 51. The first and second oil pressure delivery lines 42, 44 are respectively provided with first and second pressure sensors 56, 57, which transmit the results of detection to the ECU 51. Furthermore, a line 26 that extends from the accumulator 27 is provided with a fourth pressure sensor 59, which transmits the result of detection to the ECU 51.

In the vehicular brake system of the fifth embodiment constructed as described above, the ECU 51 sets a target output oil pressure Prt based on the pedal stroke Sp detected by the stroke sensor 52, and adjusts the openings of the first and second linear valves 30, 32. The ECU 51 also acquires the braking oil pressure Pr detected by the first pressure sensor 56, and performs feedback control so that the braking oil pressure Pr becomes equal to the target output oil pressure Prt. In this manner, the brake system is able to generate braking oil pressures in accordance with the amount of operation of the brake pedal 14 received by the input piston 102.

The brake system of the fifth embodiment includes an operating force absorbing means for absorbing the operating force applied from the brake pedal 14 to the input piston 102, and preventing the pressing force (i.e., the operating force) from being transmitted to the pressure piston 103 and from acting on the brake pedal 14 as reaction force. In this embodiment, the operating force absorbing means consists of the second pressure chamber R22 and the discharge port 114, and the first pressure-receiving area A22 of the distal end face of the input piston 102 that receives the hydraulic pressure of the second pressure chamber R22 and the second pressure-receiving area A23 of the proximal end face of the pressure piston 103 that receives the hydraulic pressure of the first pressure chamber R21 are set to be equal to each other with respect to the cross-sectional area A21 of the bore of the cylinder 101. Upon occurrence of an abnormality, the operating force applied from the brake pedal 14 causes the input piston 102 to directly press the pressure piston 103, to thereby generate braking oil pressures.

More specifically, when the driver depresses the brake pedal 14, the input piston 102 moves forward in response to the operating force of the brake pedal 14. At this time, the input piston 102 does not directly press the pressure piston 103 since the predetermined spacing S0 is provided between the input piston 102 and the pressure piston 103. With the input piston 102 thus advanced, the hydraulic oil in the second pressure chamber R22 is discharged into the reservoir tank 25 through the discharge port 114 and the oil pressure discharge line 47, and the hydraulic oil in the first pressure chamber R21 is discharged into the reservoir tank 25 through the supply ports 109, 110 and the first oil pressure discharge line 31. Thus, the input piston 102 is brought into a free condition, and the hydraulic oil in the first pressure chamber R21 does not cause reaction force to be applied to the brake pedal 14 via the input piston 102. Since the second pressure chamber R22 communicates with the third pressure chamber R23 through the idle port 117 until the input piston 102 abuts on and starts pressing the pressure piston 103, the hydraulic oil in the third pressure chamber R23 is also discharged into the reservoir tank 25 through the idle port 117 and the oil pressure discharge line 47, and no braking oil pressure is generated.

In the case where an abnormality arises in a hydraulic system that applies reaction force to the brake pedal 14, the input piston 102 moves forward by the predetermined stroke S0 upon depression of the brake pedal 14 by the driver, and then the bottom face of the hollow portion 106 of the input piston 102 directly presses the pressure piston 103 so that certain braking oil pressures Pr, Pf are applied to the wheel cylinders 39FR, 39FL, 39RR and 39RL via the ABS 40.

In the vehicular brake system of the fifth embodiment, the input piston 102 and the pressure piston 103 are axially movably supported in the cylinder 101 such that the pressure piston 103 is partially received in the input piston 102, and the brake pedal 14 is coupled to the input piston 102. With this arrangement, a control oil pressure can be supplied to the supply ports 109, 110 of the first pressure chamber R21, and the hydraulic oil in the second pressure chamber R22 can be discharged from the discharge port 114, while braking oil pressures can be delivered from the delivery ports 112, 113 of the first and third pressure chambers R21, R23.

In operation, the ECU 51 causes a control oil pressure to be applied to the first pressure chamber R21 based on the target output oil pressure Prt so as to deliver a certain braking oil pressure Pr from the first pressure chamber R21 and deliver a certain braking oil pressure Pf from the third pressure chamber R23. The braking oil pressures Pr, Pf are then applied to the wheel cylinders 39FR, 39FL, 39RR, 39RL via the ABS 40 so that appropriate braking forces commensurate with the operating force applied to the brake pedal 14 by the driver can be generated in the front wheels FR, FL and rear wheels RR, RL.

When the input piston 102 moves forward in response to the operation of the brake pedal 14, the hydraulic oil in the second pressure chamber R22 is discharged from the discharge port 114, whereby the input piston 102 does not receive the control oil pressure. In this condition, the spring force of the reaction-force spring 87 is transmitted as reaction force to the brake pedal 14 via the input piston 102 so that appropriate reaction force commensurate with the operating force of the brake pedal 14 can be exerted on the driver.

Sixth Embodiment

Figure 8A:
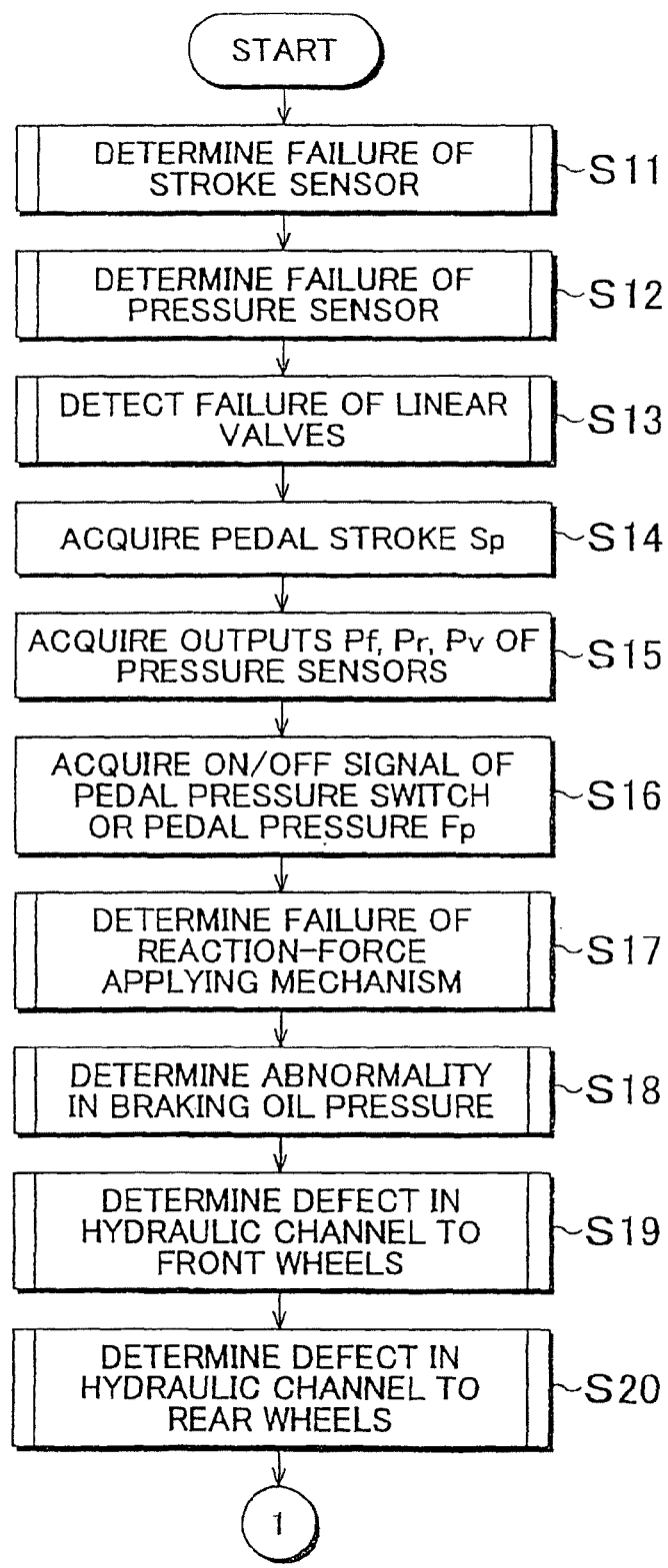
FIG. 8A is a flowchart illustrating failure determination control performed by a vehicular brake system according to a sixth embodiment of the invention.
Figure 8B:
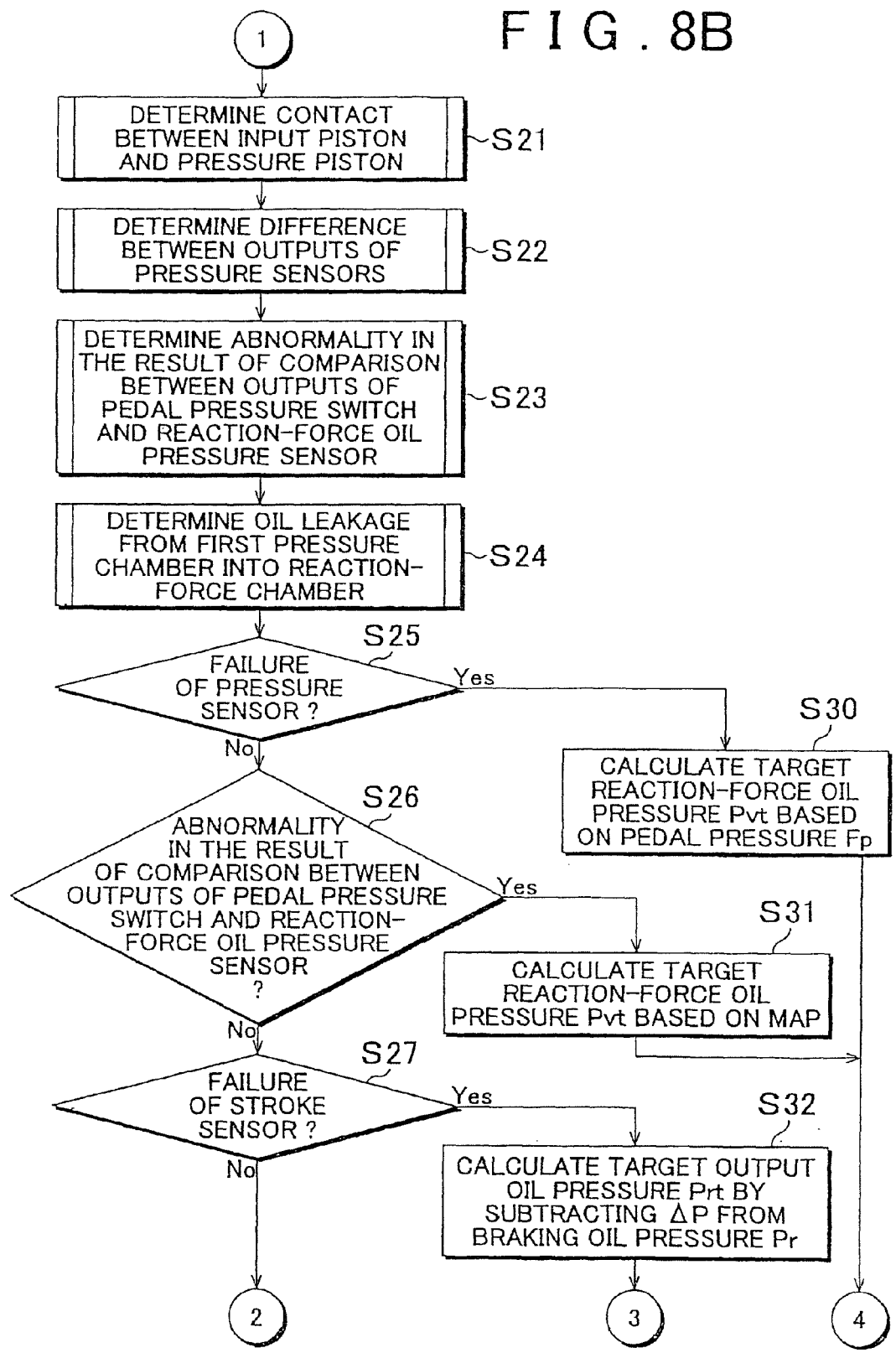
FIG. 8B is a flowchart illustrating failure determination control performed by the vehicular brake system according to the sixth embodiment of the invention.
Figure 8C:
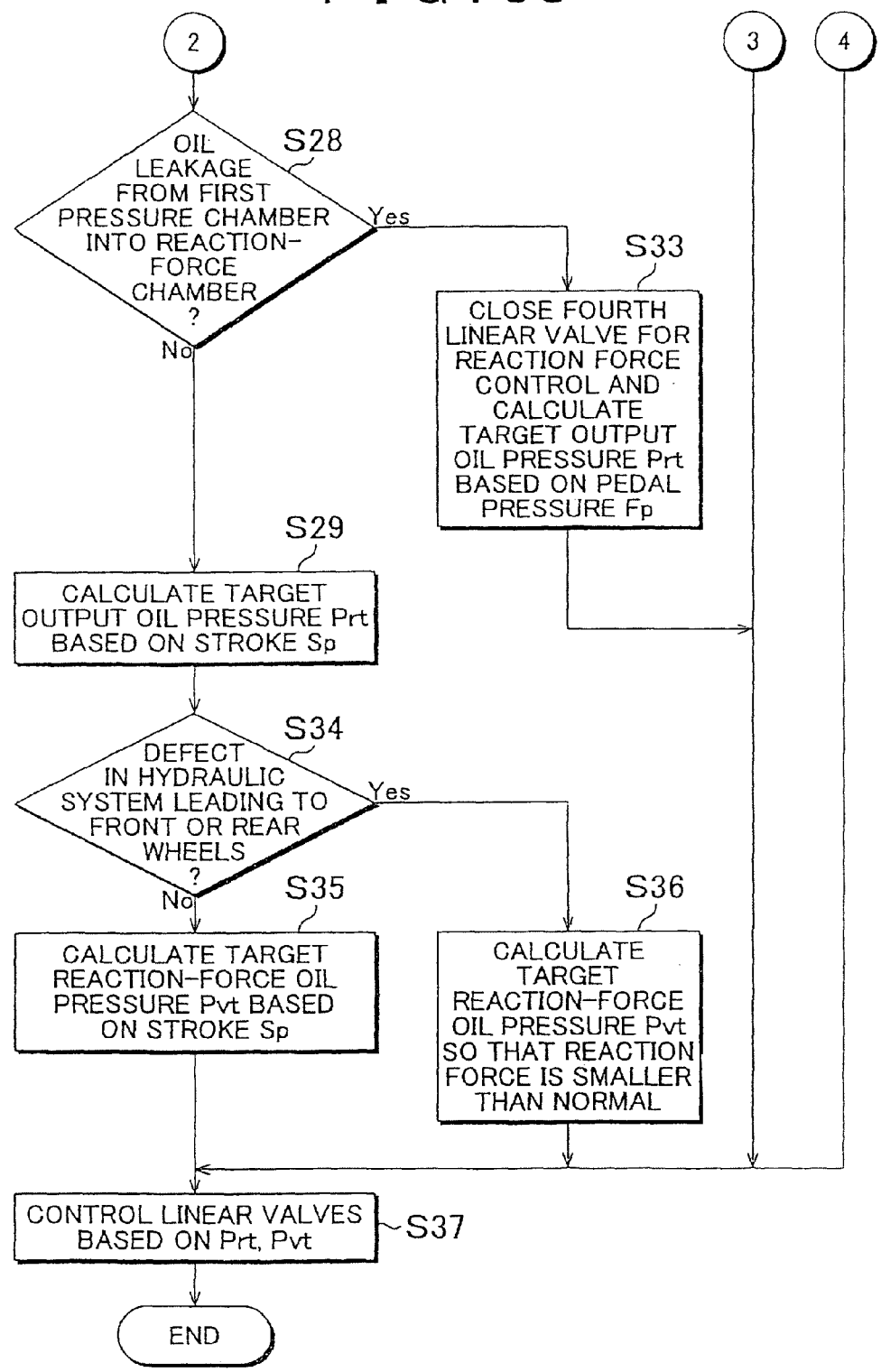
FIG. 8C is a flowchart illustrating failure determination control performed by the vehicular brake system according to the sixth embodiment of the invention
Figure 11:
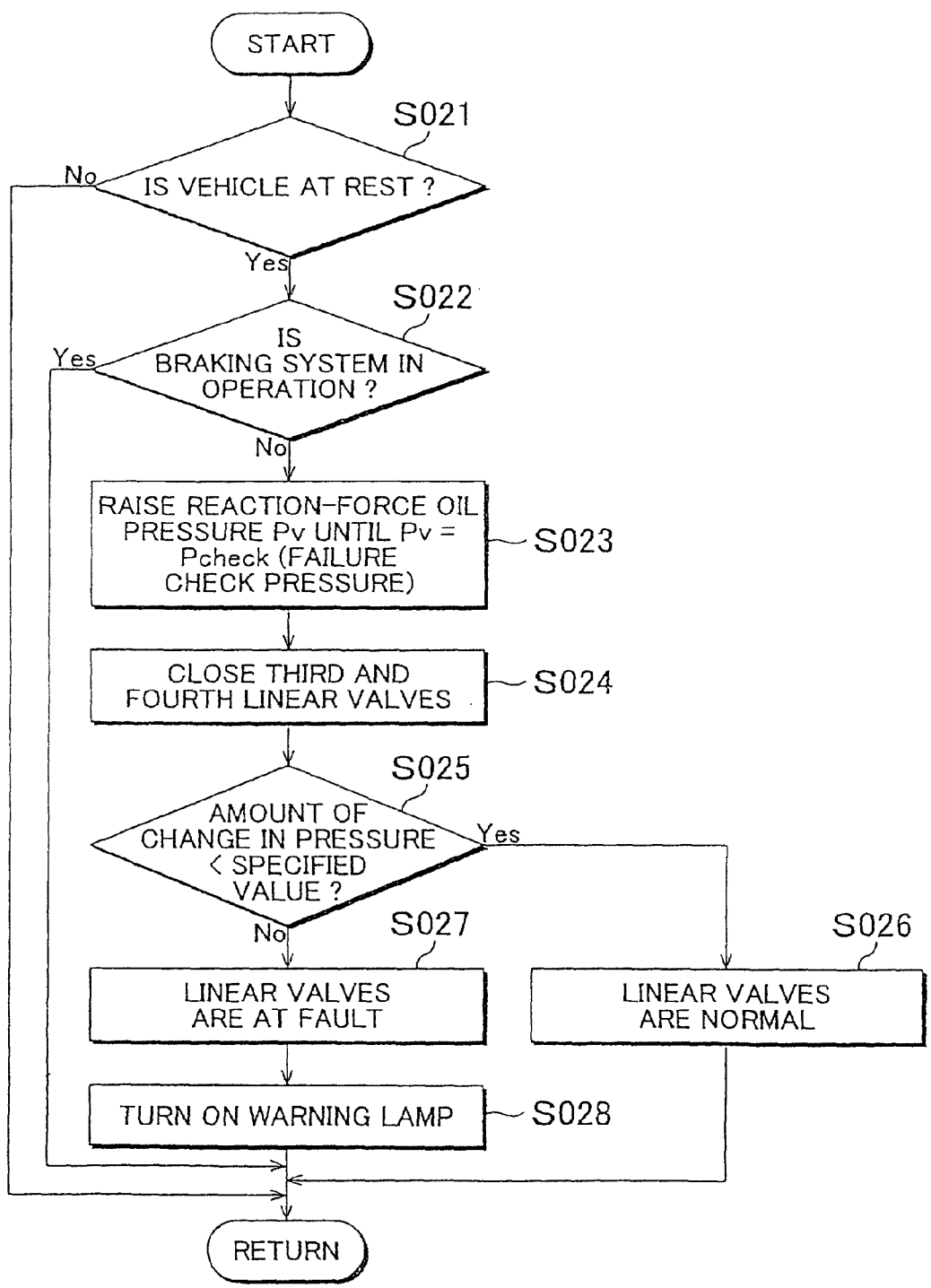
FIG. 11 is a flowchart illustrating a control routine for detecting a failure of linear valves.
Figure 12:
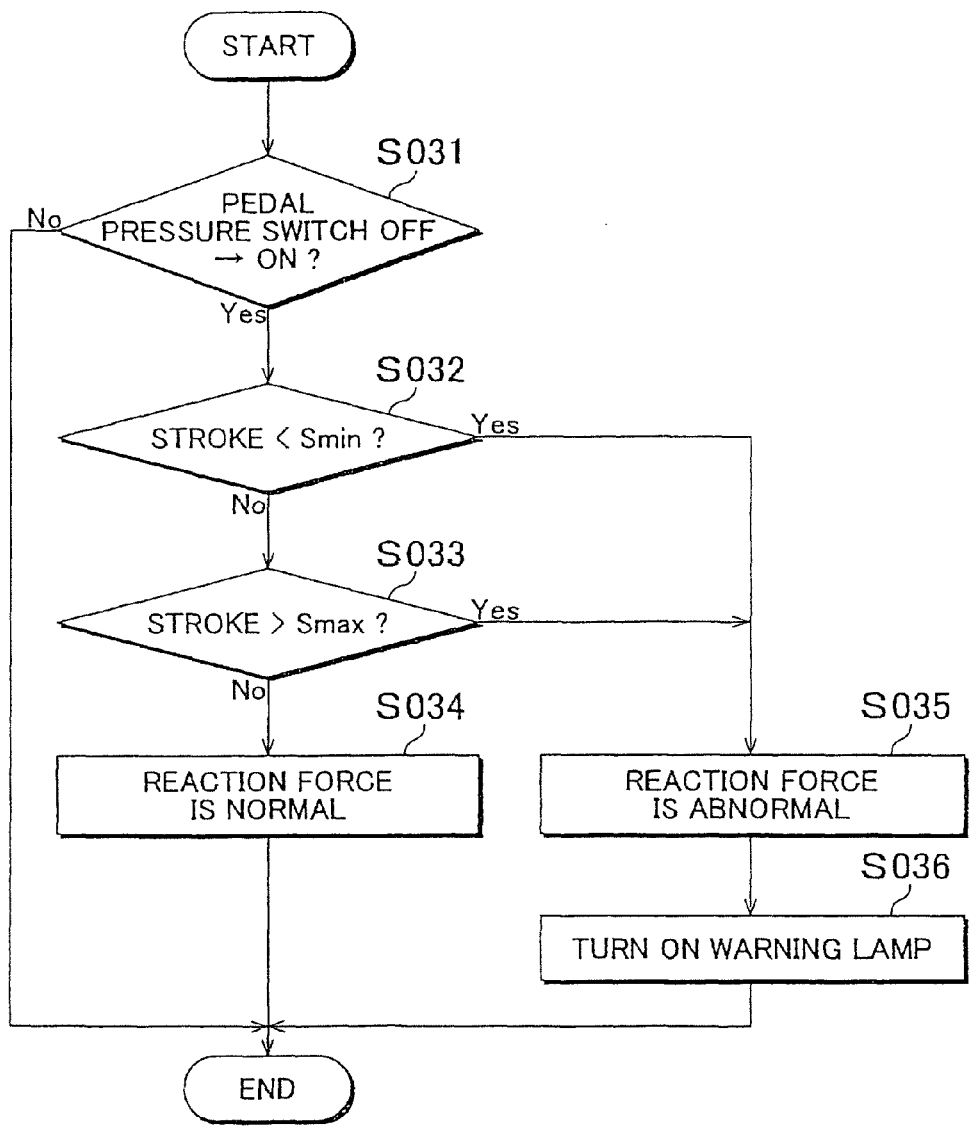
FIG. 12 is a flowchart illustrating a control routine for determining a failure of a mechanism for applying reaction force.
Figure 13:
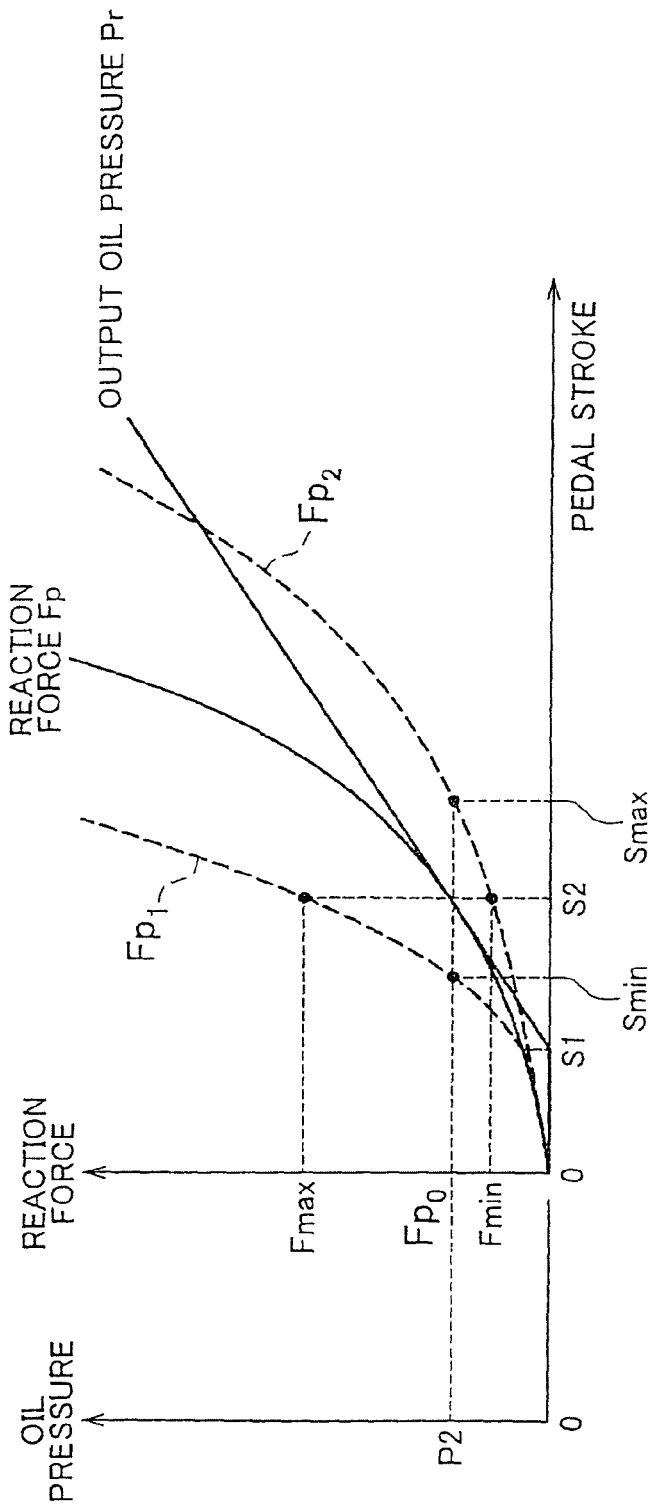
FIG. 13 is a graph indicating output oil pressure and reaction force with respect to the pedal stroke, which graph is used for explaining determination of a failure of the reaction-force applying mechanism.
Figure 14:
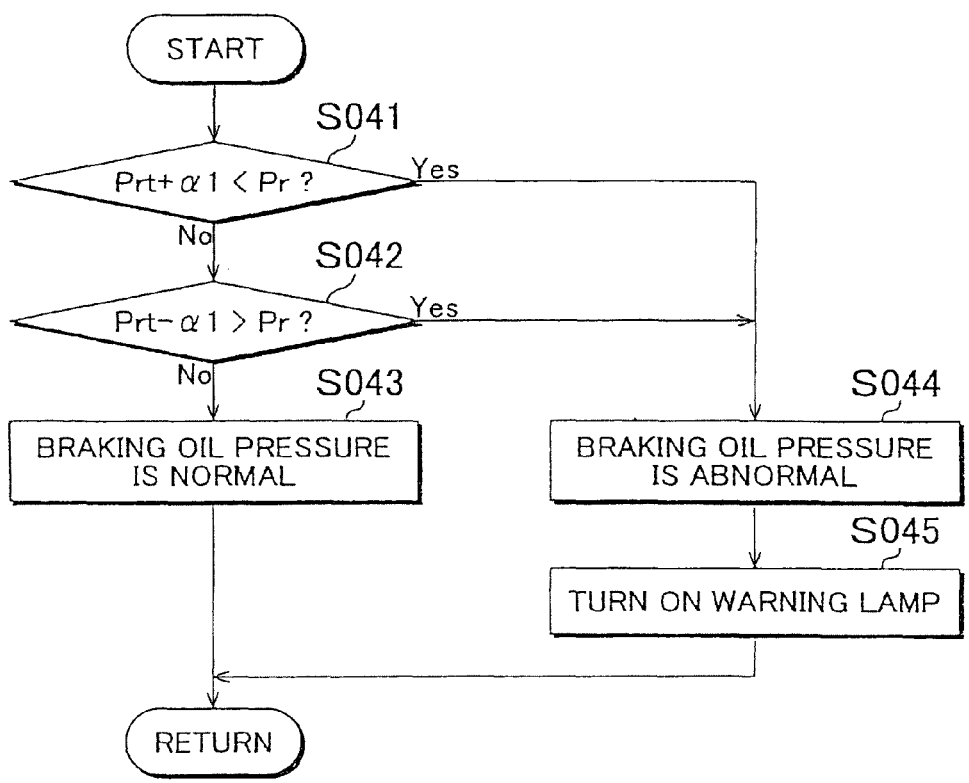
FIG. 14 is a flowchart illustrating a control routine for determining an abnormality in the braking oil pressure.
Figure 15:
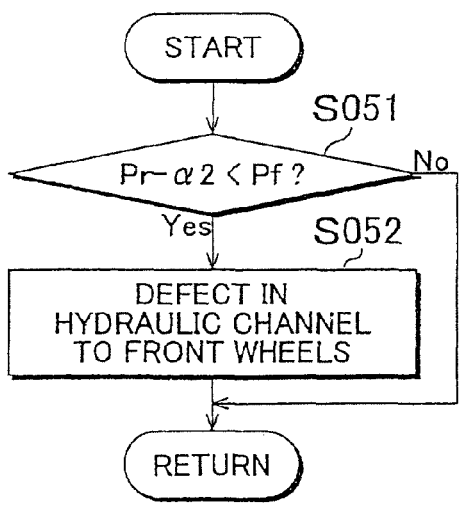
FIG. 15 is a flowchart illustrating a control routine for determining a defect in an oil hydraulic channel leading to the front wheels.
Figure 16:
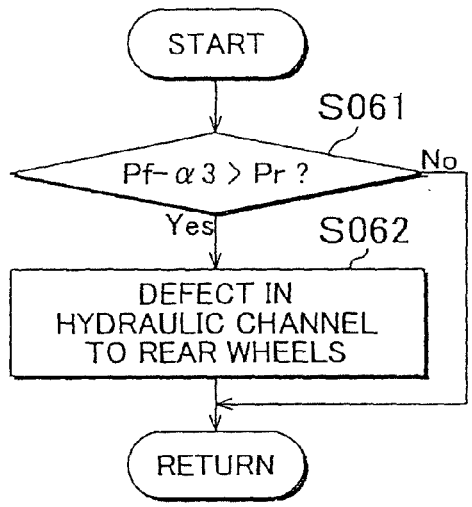
FIG. 16 is a flowchart illustrating a control routine for determining a defect in an oil hydraulic channel leading to the rear wheels.
Figure 17:
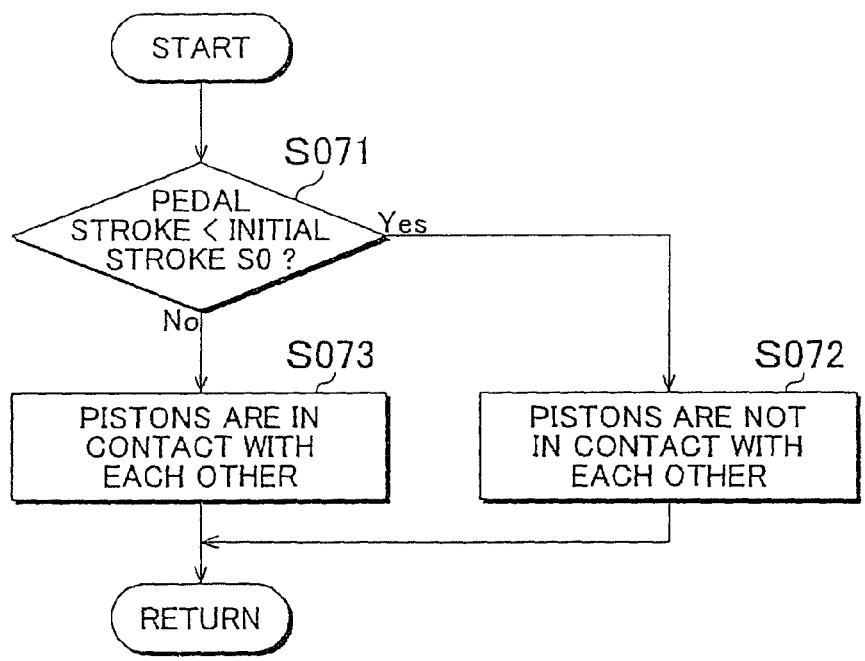
FIG. 17 is a flowchart illustrating a control routine for determining contact between an input piston and a pressure piston.
Figure 18:
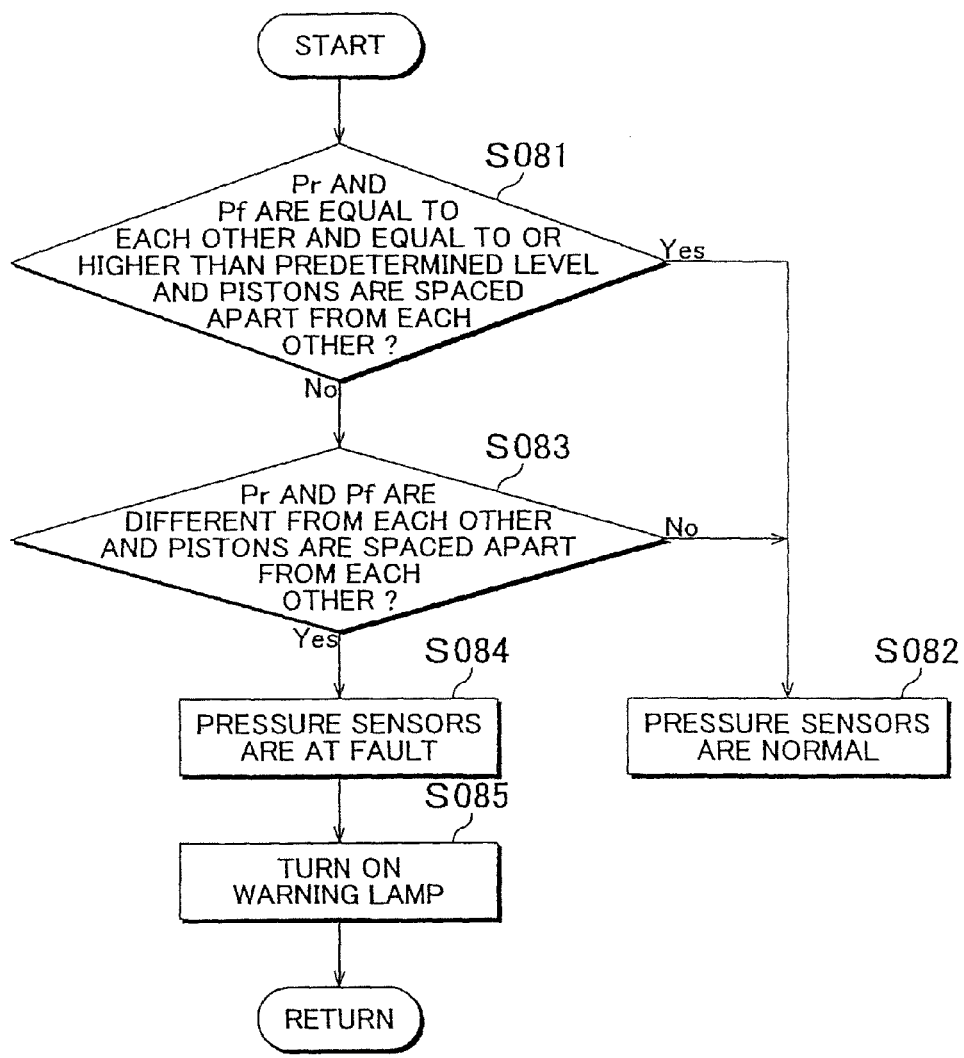
FIG. 18 is a flowchart illustrating a control routine for detecting a difference between the outputs of pressure sensors.
Figure 19:
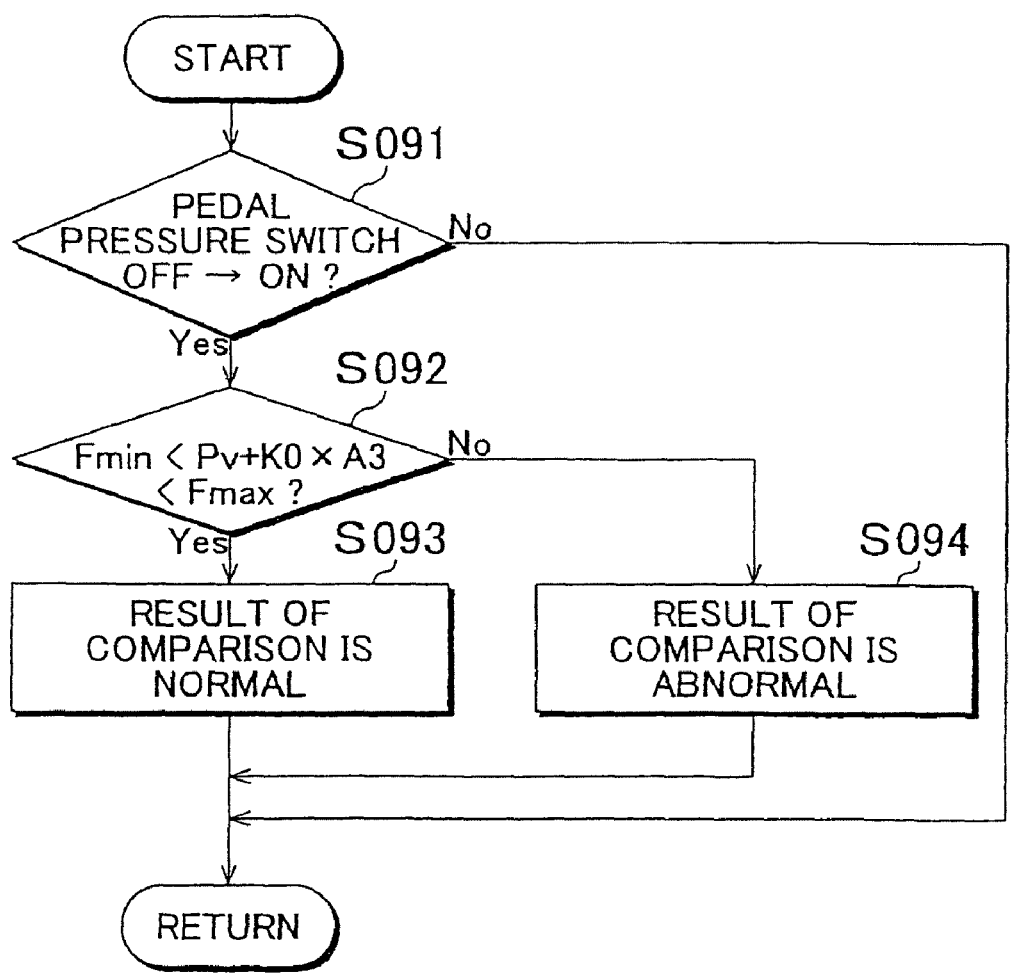
FIG. 19 is a flowchart illustrating a control routine for determining an abnormality in the result of comparison between the outputs of a pedal pressure switch and a reaction-force pressure sensor.
Figure 20:
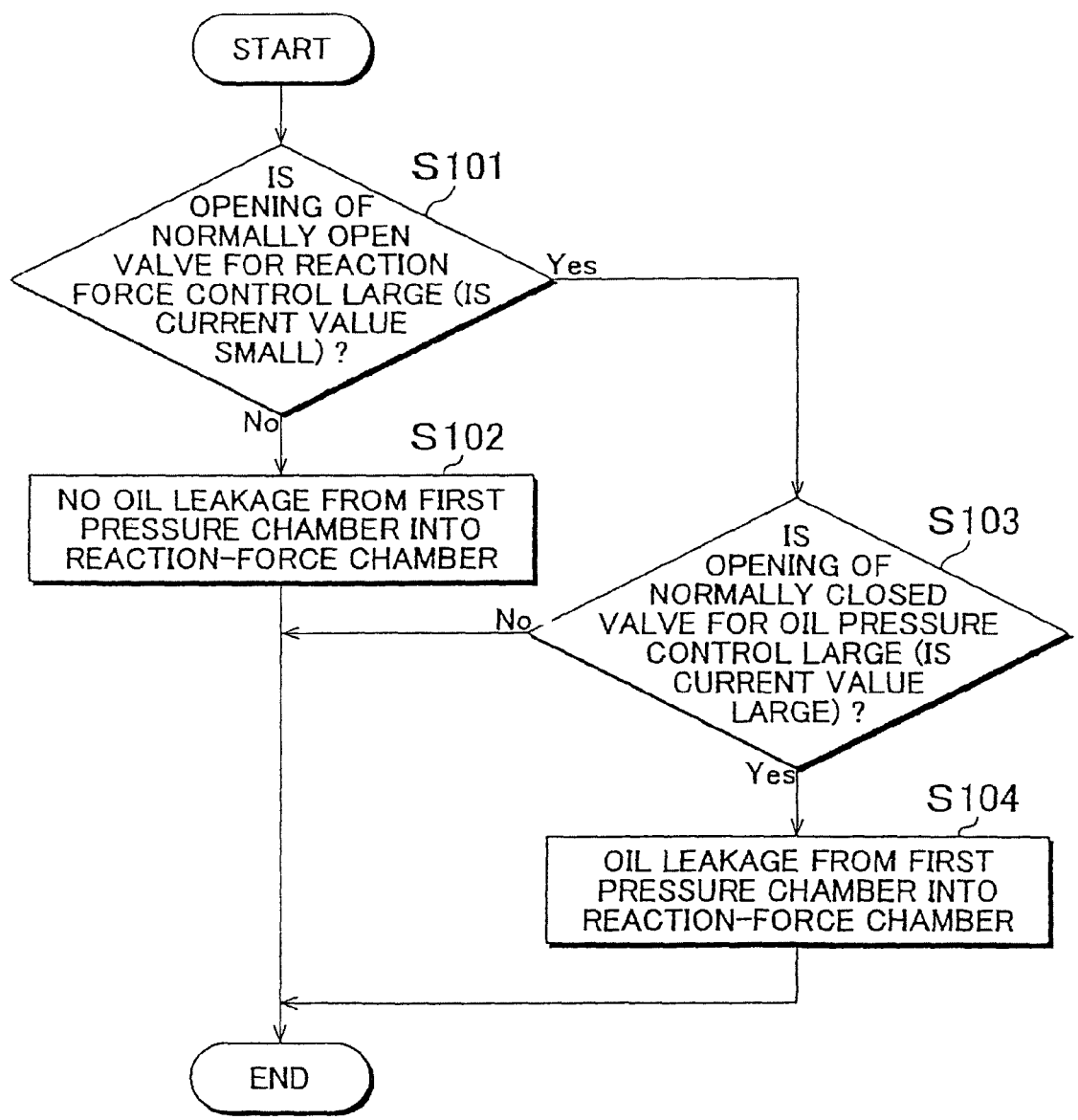
FIG. 20 is a flowchart illustrating a control routine for determining leakage of the hydraulic oil from a first pressure chamber into a reaction-force chamber.
Figure 21:
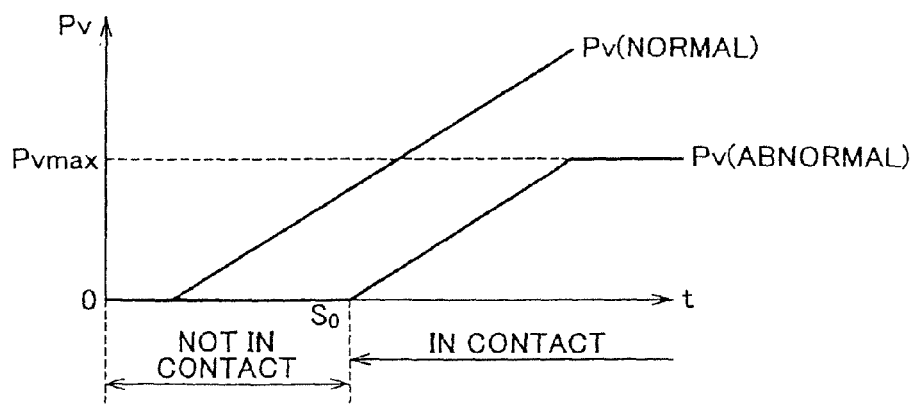
FIG. 21 is a graph used for explaining setting of the reaction-force oil pressure when a failure of the reaction-force pressure sensor is detected.
Figure 22:
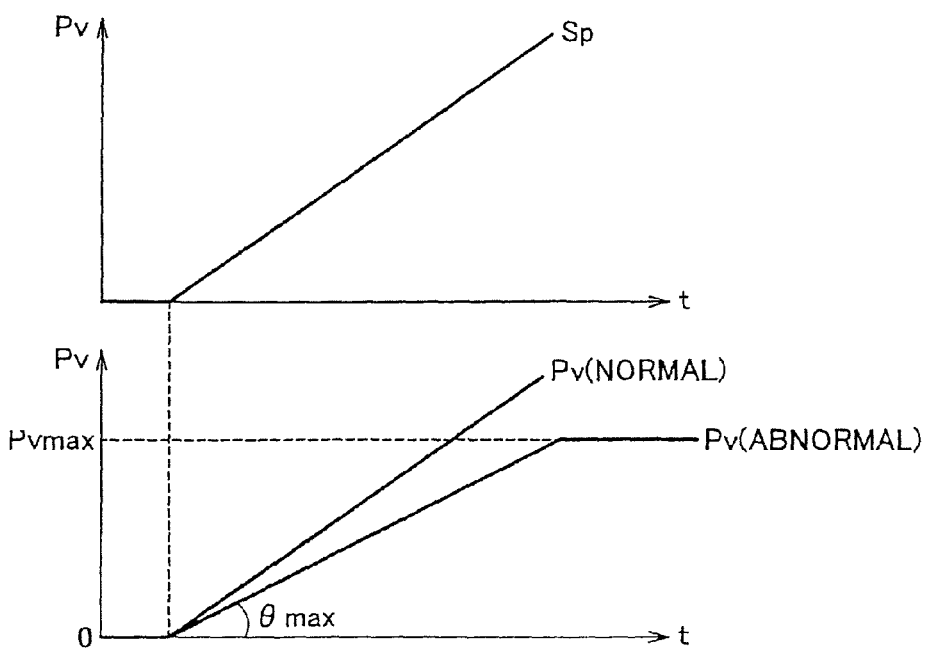
FIG. 22 is a graph used for explaining setting of the reaction-force oil pressure when an abnormality is detected in the result of comparison between the outputs of the pedal pressure switch and the reaction-force pressure sensor.
Figure 23:
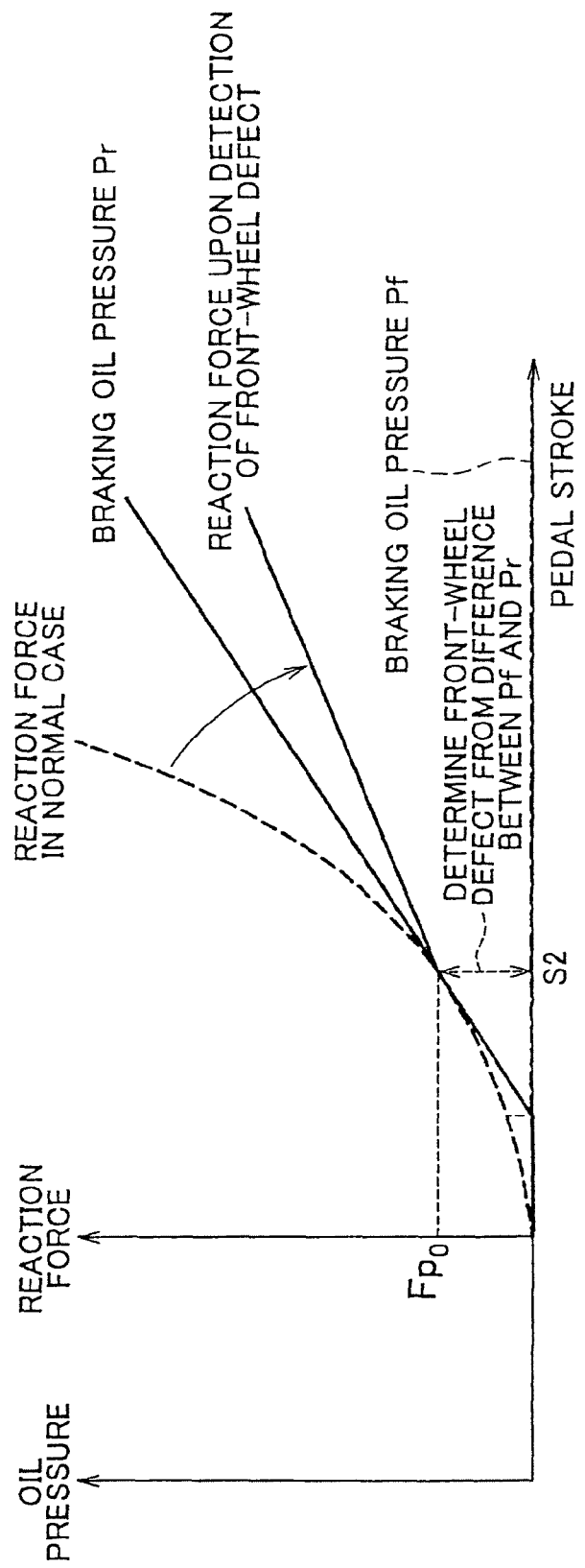
FIG. 23 is a graph used for explaining setting of the reaction-force oil pressure upon detection of a defect in the oil hydraulic channel leading to the front wheels.
Figure 24:
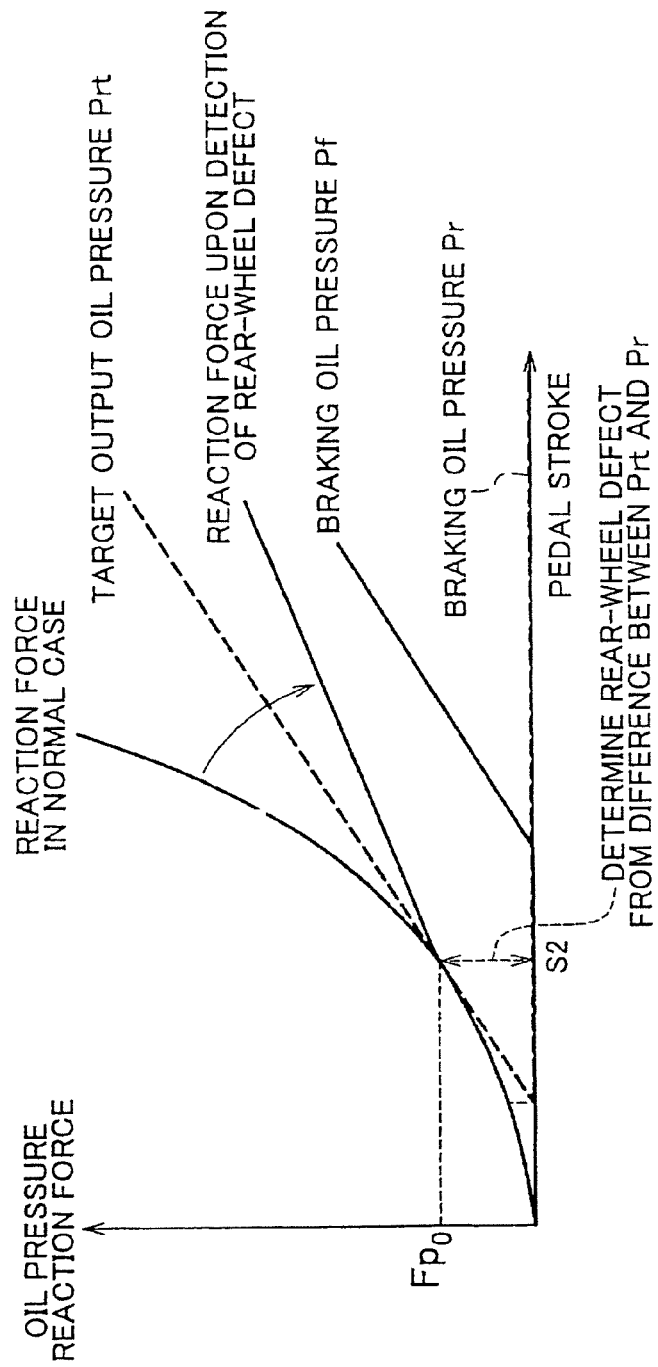
FIG. 24 is a graph used for explaining setting of the reaction-force oil pressure upon detection of a defect in the oil hydraulic channel leading to the rear wheels.

FIG. 8A, FIG. 8B and FIG. 8C are flowcharts illustrating failure determination control performed by a vehicular brake system according to a sixth embodiment of the invention. FIG. 9 is a flowchart illustrating a control routine for determining a failure of a stroke sensor. FIG. 10 is a flowchart illustrating a control routine for determining a failure of a pressure sensor. FIG. 11 is a flowchart illustrating a control routine for detecting a failure of linear valves. FIG. 12 is a flowchart illustrating a control routine for determining a failure of a mechanism for applying reaction force. FIG. 13 is a graph indicating the output oil pressure and the reaction force with respect to the pedal stroke, which graph is used for explaining determination of a failure of the reaction-force applying mechanism. FIG. 14 is a flowchart illustrating a control routine for determining an abnormality in the braking oil pressure. FIG. 15 is a flowchart illustrating a control routine for determining a defect in an oil hydraulic channel leading to the front wheels. FIG. 16 is a flowchart illustrating a control routine for determining a defect in an oil hydraulic channel leading to the rear wheels. FIG. 17 is a flowchart illustrating a control routine for determining contact between an input piston and a pressure piston. FIG. 18 is a flowchart illustrating a control routine for detecting a difference between the outputs of pressure sensors. FIG. 19 is a flowchart illustrating a control routine for determining an abnormality in the result of comparison between the outputs of a pedal pressure switch and a reaction-force pressure sensor. FIG. 20 is a flowchart illustrating a control routine for determining leakage of the hydraulic oil from a first pressure chamber into a reaction-force chamber. FIG. 21 is a graph used for explaining setting of the reaction-force oil pressure when a failure of the reaction-force pressure sensor is detected. FIG. 22 is a graph used for explaining setting of the reaction-force oil pressure when an abnormality is detected in the result of comparison between the outputs of the pedal pressure switch and the reaction-force pressure sensor. FIG. 23 is a graph used for explaining setting of the reaction-force oil pressure upon detection of a defect in the oil hydraulic channel leading to the front wheels. FIG. 24 is a graph used for explaining setting of the reaction-force oil pressure upon detection of a defect in the oil hydraulic channel leading to the rear wheels.

In the sixth embodiment, the overall structure of the vehicular brake system is substantially identical with that of the first embodiment as described above. Thus, the sixth embodiment will be described with reference to FIG. 1, and the same reference numerals as used in the first embodiment will be used for identifying structurally and/or functionally corresponding elements, of which detailed description will not be provided.

In the braking force control, reaction force control and failure determination control of the vehicular brake system of the sixth embodiment, a failure of the stroke sensor 52 that detects the pedal stroke Sp is determined in step S11, and a failure of the third pressure sensor 58 that detects the reaction-force oil pressure Pv supplied to the reaction-force chamber R4 is determined in step S12, as shown in FIG. 8A. Also, a failure of each of the linear valves 30, 32, 35, 37 is detected in step S13.

To determine a failure of the stroke sensor 52 in step S11, it is determined in step S001 of FIG. 9 whether the output of sensor 1 as the stroke sensor 52 itself and the output of sensor 2 are identical with each other. If it is determined that the output of sensor 1 is identical with the output of sensor 2, it is determined in step S002 that the stroke sensor 52 operates normally. If the output of sensor 1 is not identical with the output of sensor 2, it is determined in step S003 that the stroke sensor 52 is at fault.

To determine a failure of the third pressure sensor 58 in step S12, it is determined in step S011 of FIG. 10 whether the output of sensor 1 as the third pressure sensor 58 itself and the output of sensor 2 are identical with each other. If it is determined that the output of sensor 1 is identical with the output of sensor 2, it is determined in step S012 that the third pressure sensor 58 operates normally. If the output of sensor 1 is not identical with the output of sensor 2, it is determined in step S013 that the third pressure sensor 58 is at fault.

To detect a failure or failures of the linear valves 30, 32, 35, 37 in step S13, it is determined in step S021 whether the vehicle is at rest, namely, the vehicle is in a stopped state, and it is determined in step S022 whether the brake system is in operation, as shown in FIG. 11. More specifically, the ECU 51 determines whether the vehicle is at rest, based on the result of detection of the wheel speed sensor 60, and determines whether the brake system is in operation, based on the ON/OFF signal of the stop lamp switch 55. If it is determines in step S021 that the vehicle is not at rest, or it is determined in step S022 that the brake system is in operation, the current cycle of the control routine of FIG. 11 is finished. If i is determined in step S021 that the vehicle is at rest and it is determined in step S022 that the brake system is not in operation, step S023 and subsequent steps are executed to detect a failure(s) of the third and fourth linear valves 35, 37.

In step S023, the third linear valve 35 is opened and the fourth linear valve 37 is closed so as to raise the reaction-force oil pressure Pv of the reaction-force chamber R4 to a failure check pressure Pcheck. In this case, the third linear valve 35 is controlled so that the reaction-force oil pressure Pv detected by the third pressure sensor 58 becomes equal to the failure check pressure Pcheck. If the reaction-force oil pressure Pv becomes equal to the failure check pressure Pcheck, the third linear valve 35 and fourth linear valve 37 are closed in step S024 so as to hold the reaction-force oil pressure Pv of the reaction-force chamber R4, and it is determined in step S025 whether the amount of change in the pressure is smaller than a specified value. If the amount of change in the reaction-force oil pressure Pv of the reaction-force chamber R4 is smaller than the specified value, it is determined in step S026 that the linear valves 35, 37 operate normally. If the amount of change in the reaction-force oil pressure Pv of the reaction-force chamber R4 is equal to or larger than the specified value, it is determined in step S027 that there is an abnormality in the linear valves 35, 37, and step S028 is executed to turn on a warning lamp so as to inform the driver of the failure.

While the process for detecting a failure of the third and fourth linear valves 35, 37 has been explained above with reference to the flowchart of FIG. 11, a failure of the first and second linear valves 30, 32 may be detected in substantially the same manner.

After the processes for detecting a failure of each of the sensors 52, 58 and a failure of each of the linear valves 30, 32, 35, 37 are finished, the ECU 51 acquires the pedal stroke Sp detected by the stroke sensor 52 in step S14, and acquires the braking oil pressure Pr detected by the first pressure sensor 56, the braking oil pressure Pf detected by the second pressure sensor 57, and the reaction-force oil pressure Pv detected by the third pressure sensor 58, as shown in FIG. 8A. Then, the ECU 51 acquires the ON/OFF signal of the pedal pressure switch 54 in step S16.

Subsequently, a failure of the reaction-force applying mechanism that applies reaction force to the brake pedal 14 is determined in step S17, and an abnormality in the braking oil pressure is determined in step S18. Then, a defect in the oil hydraulic channel leading to the front wheels is determined in step S19, and a defect in the oil hydraulic channel leading to the rear wheels is determined in step S20.

To determine a failure of the reaction-force applying mechanism in step S17, it is determined in step S031 of FIG. 12 whether the pedal pressure switch 54 is placed in the ON state, and the current cycle of the routine of FIG. 12 is finished if the pedal pressure switch 54 is in the OFF state. The pedal pressure switch 54 is switched from OFF to ON when the pedal pressure Fp exceeds a predetermined level Fp0. If the pedal pressure switch 54 is turned ON, it is determined in step S032 whether the pedal stroke Sp is smaller than the stroke lower limit value Smin, and it is determined in step S033 whether the pedal stroke Sp is larger than the stroke upper limit value Smax.

If it is determined in step S032 that the pedal stroke Sp is equal to or larger than the stroke lower limit value Smin, and it is determined in step S033 that the pedal stroke Sp is equal to or smaller than the stroke upper limit value Smax, as is the case with the reaction force Fp indicated by a solid line in FIG. 13, it is determined in step S034 that the reaction force is normal. On the other hand, if it is determined in step S032 that the pedal stroke Sp is smaller than the stroke lower limit value Smin, as is the case with the reaction force Fp1 indicated by a dotted line in FIG. 13, or it is determined in step S033 that the pedal stroke Sp is larger than the stroke upper limit value Smax, as is the case with the reaction force Fp2 indicated by a dotted line in FIG. 13, it is determined in step S035 that the reaction force is abnormal, and a warning lamp is turned on to inform the driver of the abnormality in step S036.

While an abnormality in the reaction force is determined based on the pedal stroke Sp detected when the pedal pressure switch 54 is turned ON in the above-described process for determining a failure of the reaction-force applying mechanism, it may be determined that the reaction force is normal when the pedal pressure Fp detected by the pedal pressure sensor 53 at the pedal stroke S2 is equal to or larger than the reaction-force lower limit value Fmin and is equal to or smaller than the reaction-force upper limit value Fmax, as shown in FIG. 13.

To determine an abnormality in the braking oil pressure in step S18, it is determined in step S041 whether the braking oil pressure Pr detected by the first pressure sensor 56 is larger than a value obtained by adding a preset value $\alpha 1$ to the target output oil pressure Prt, and it is determined in step S042 whether the braking oil pressure Pr is smaller than a value obtained by subtracting a present value $\alpha 1$ from the target output oil pressure Prt, as shown in FIG. 14. If it is determined in step S041 that the braking oil pressure Pr is equal to or smaller than the value obtained by adding the preset value $\alpha 1$ to the target output oil pressure Prt, and it is determined in step S042 that the braking oil pressure Pr is equal to or larger than the value obtained by subtracting the preset value $\alpha 1$ from the target output oil pressure Prt, it is determined in step S043 that the braking oil pressure is normal. On the other hand, if it is determined in step S041 that the braking oil pressure Pr is larger than the value obtained by adding the preset value $\alpha 1$ to the target output oil pressure Prt, or it is determined in step S042 that the braking oil pressure Pr is smaller than the value obtained by subtracting the preset value $\alpha 1$ from the target output oil pressure Prt, it is determined in step S044 that the braking oil pressure is abnormal, and a warning lamp is turned on to inform the driver of the abnormality in step S045.

To determine a defect in the oil hydraulic channel leading to the front wheels in step S19, it is determined in step S051 of FIG. 15 whether the braking oil pressure Pf detected by the second pressure sensor 57 is smaller than a value obtained by subtracting a preset value a2 from the braking oil pressure Pr detected by the first pressure sensor 56. If it is determined that the braking oil pressure Pf is smaller than the value obtained by subtracting the preset value $\alpha 2$ from the braking oil pressure Pr, it is determined in step S052 that there is a defect in the oil hydraulic channel that leads to the front wheels. Namely, when a defect arises in the oil hydraulic channel that extends from the third pressure chamber R3 to the ABS 40 via the second oil pressure delivery line 44, the braking oil pressure Pf is reduced. The reduction of the braking oil pressure Pf, which indicates a defect in the oil hydraulic channel leading to the front wheels, can be detected by comparing the braking oil pressure Pf with the braking oil pressure Pr.

To determine a defect in the oil hydraulic channel leading to the rear wheels in step S20, it is determined in step S061 of FIG. 16 whether the braking oil pressure Pr detected by the first pressure sensor 56 is smaller than a value obtained by subtracting a preset value $\alpha 3$ from the braking oil pressure Pf. If it is determined that the braking oil pressure Pr is smaller than the value obtained by subtracting the preset value $\alpha 3$ from the braking oil pressure Pf, it is determined in step S062 that there is a defect in the oil hydraulic channel that leads to the rear wheels. Namely, when a defect arises in the oil hydraulic channel that extends from the first pressure chamber R1 to the ABS 40 via the first oil pressure delivery line 42, the braking oil pressure Pr is reduced. The reduction of the braking oil pressure Pr, which indicates a defect in the oil hydraulic channel leading to the rear wheels, can be detected by comparing the braking oil pressure Pr with the braking oil pressure Pf.

As shown in FIG. 8A, contact between the input piston 12 and the pressure piston 13 is determined in step S21, and a difference between the outputs of the first and second pressure sensors 56, 57 is determined in step S22. Also, an abnormality in the result of comparison between the outputs of the pedal pressure switch 54 and the third pressure sensor 58 is determined in step S23, and leakage of the hydraulic oil from the first pressure chamber R1 into the reaction-force chamber R4 is determined in step S24.

To determine contact between the input piston 12 and the pressure piston 13 in step S21, it is determined in step S071 of FIG. 17 whether the pedal stroke Sp detected by the stroke sensor 52 is smaller than the initial stroke S0 (i.e., the spacing between the input piston 12 and the pressure piston 13). If it is determined in step S071 that the pedal stroke Sp is smaller than the initial stroke S0, it is determined in step S072 that the pistons 12, 13 are not in contact with each other. If the pedal stroke Sp is equal to or larger than the initial stroke S0, it is determined in step S073 that the pistons 12, 13 may be in contact with each other.

To determine a difference between the outputs of the first and second pressure sensors 56, 57 in step S22, it is determined in step S081 of FIG. 18 whether the hydraulic pressures of the two delivery lines, i.e., the braking oil pressure Pr and the braking oil pressure Pf, are equal to each other, and are equal to or larger than a predetermined pressure level. It is also determined in step S081 whether the pistons 12, 13 are spaced apart from each other (i.e., the pistons 12, 13 are not in contact with each other), based on the result of determination in step S21. If the braking oil pressure Pr and the braking oil pressure Pf are equal to each other, and are equal to or larger than the predetermined level, and the pistons 12, 13 are not in contact with each other, it is determined in step S082 that the first and second pressure sensors 56, 57 operate normally. On the other hand, if the braking oil pressure Pr and the braking oil pressure Pf are not equal to each other, or are lower than the predetermined level, or the pistons 12, 13 are in contact with each other, it is determined in step S083 whether there is a difference between the braking oil pressure Pr and the braking oil pressure Pf and whether the pistons 12, 13 are spaced apart from each other (i.e., the pistons 12, 13 are not in contact with each other). If there is a difference between the braking oil pressure Pr and the braking oil pressure Pf and the pistons 12, 13 are not in contact with each other, it is determined in step S084 that there is an abnormality in the first and second pressure sensors 56, 57, and a warning lamp is turned on to inform the driver of the abnormality in step S085.

To determine an abnormality in the result of comparison between the outputs of the pedal pressure switch 54 and the third pressure sensor 58 in step S23, it is determined in step S091 whether the pedal pressure switch 54 is placed in the ON state, as shown in FIG. 19. If the pedal pressure switch 54 is in the OFF state, the current cycle of the routine of FIG. 19 is finished. The pedal pressure switch 54 is switched from OFF to ON when the pedal pressure Fp exceeds a predetermined pedal pressure Fp0. When the pedal pressure switch 54 is turned ON, namely, when a certain pedal pressure Fp appears, it is determined in step S092 whether the value obtained by adding the spring force (k0×A3) to the reaction-force oil pressure Pv detected by the third pressure sensor 58 is larger than the lower limit value Fmin of the pedal pressure Fp and is smaller than the upper limit value Fmax, namely, whether the reaction-force oil pressure Pv is within a predetermined range. If the reaction-force oil pressure is within the predetermined range, it is determined in step S093 that the relationship between the outputs of the pedal pressure switch 54 and the third pressure sensor 58 is normal. If the reaction-force oil pressure Pv is not within the predetermined range, it is determined in step S094 that the relationship between the outputs of the pedal pressure switch 54 and the third pressure sensor 58 is abnormal.

To determine leakage of the hydraulic oil from the first pressure chamber R1 into the reaction-force chamber R4 in step S24, it is determined in step S101 of FIG. 20 whether the opening of the fourth linear valve 37 used for reaction-force control is large (namely, the current value is small because the fourth linear valve 37 is normally open). If the opening of the fourth linear valve 37 is not large, it is determined in step S102 that there is no leakage of the hydraulic oil from the first pressure chamber R1 into the reaction-force chamber R4. If it is determined in step S101 that the opening of the fourth linear valve 37 is large, on the other hand, it is determined in step S103 whether the opening of the first linear valve 30 used for braking oil pressure control is large (the current value is large because the first linear valve 30 is normally closed). If the opening of the first linear valve 30 is large, it is determined in step S104 that there is leakage of the hydraulic oil from the first pressure chamber R1 into the reaction-force chamber R4.

If there is leakage of the hydraulic oil from the first pressure chamber R1 into the reaction-force chamber R4, the hydraulic pressure of the reaction-force chamber R4 is raised to be higher than the target reaction-force oil pressure Pvt, and, therefore, the opening of the fourth linear valve 37 needs to be increased. If the hydraulic oil in the first pressure chamber R1 flows into the reaction-force chamber R4, the pressure of the first pressure chamber R1 is reduced, and the opening of the first linear valve 30 is increased. Thus, leakage of the hydraulic oil from the first pressure chamber R1 into the reaction-force chamber R4 can be detected based on the opening of the fourth linear valve 37 and the opening of the first linear valve 30.

If various types of failures or abnormalities are determined in the manners as described above, various measures as explained below are taken against the respective failures. As shown in FIG. 8B, it is determined in step S25 whether the third pressure sensor 58 is at fault, based on the result of determination in the above-described step S12. If the third pressure sensor 58 operates normally, the ECU 51 proceeds to step S26. In step S26, it is determined whether the relationship between the outputs of the pedal pressure switch 54 and the third pressure sensor 58 is abnormal, based on the result of determination in step S23. If the relationship is normal, the ECU 51 proceeds to step S27. In step S27, it is determined whether the stroke sensor 52 is at fault, based on the result of determination in step S11. If the stroke sensor 52 operates normally, the ECU 51 proceeds to step S28. In step S28, it is determined whether there is leakage of the hydraulic oil from the first pressure chamber R1 into the reaction-force chamber R4, based on the result of determination in step S24. If there is no leakage, the ECU 51 proceeds to step S29.

In step S29, the ECU 51 calculates a target output oil pressure Prt by using a map that is set in advance based on the pedal stroke Sp detected by the stroke sensor 52.

If it is determined in step S25 that the third pressure sensor 58 is at fault, the ECU 51 proceeds to step S30. When the third pressure sensor 58 is at fault, the actual reaction-force oil pressure Pv cannot be controlled in a feedback manner with respect to the target reaction-force oil pressure Pvt, and therefore, the target reaction-force oil pressure Pvt is calculated based on the pedal pressure Fp detected by the pedal pressure sensor 53. As shown in FIG. 21, while the input piston 12 and the pressure piston 13 are not in contact with each other in the initial period of the operation of the brake pedal 14, the input piston 12 is brought into contact with the pressure piston 13 when the pedal stroke Sp becomes equal to the initial stroke S0, and the pedal pressure Fp is generated. Accordingly, the ECU 51 sets the target reaction-force oil pressure Pvt based on the pedal pressure Fp generated after the input piston 12 contacts with the pressure piston 13. In this case, the upper limit value Pvmax is provided for restricting an increase of the reaction force due to a sudden or abrupt operation of the brake pedal 14.

If it is determined in step S26 that the relationship between the outputs of the pedal pressure switch 54 (or pedal pressure sensor 53) and the third pressure sensor 58 is abnormal, the ECU 51 proceeds to step S31. When the relationship between the outputs of the pedal pressure switch 54 and the third pressure sensor 58 is abnormal, the actual reaction-force oil pressure Pv cannot be controlled in a feedback manner with respect to the target reaction-force oil pressure Pvt, and the target reaction-force oil pressure Pvt cannot be calculated based on the pedal pressure Fp detected by the pedal pressure sensor 53. Accordingly, the target reaction-force oil pressure Pvt is calculated based on the braking oil pressure Pr produced after the input piston 12 contacts with the pressure piston 13. In this case, the upper limit value θmax of the slope of the target reaction-force oil pressure Pvt and the upper limit value Pvmax are provided, as shown in the map of FIG. 22.

If it is determined in step S27 that the stroke sensor 52 is at fault, the ECU 51 proceeds to step S32. When the stroke sensor 52 is at fault, the ECU 51 cannot calculate the target output oil pressure Prt based on the pedal stroke Sp detected by the stroke sensor 52. In this case, the ECU 51 sets the target output oil pressure Prt by subtracting a predetermined value ΔP from the braking oil pressure Pf detected by the second pressure sensor 57. In this connection, the braking oil pressure Pr may be set to be equal to the braking oil pressure Pf. In this case, however, the pressure piston 13 is automatically advanced under servo control, which may make the driver uncomfortable. Thus, the target output pressure Prt is set to a value that is smaller than Pf by ΔP (a pressure which may arise from errors in the sensors, or the like).

If it is determined in step S28 that there is leakage of the hydraulic oil from the first pressure chamber R1 into the reaction-force chamber R4, the ECU 51 proceeds to step S33. When there is leakage of the hydraulic oil from the first pressure chamber R1 into the reaction-force chamber R4, the hydraulic oil in the first pressure chamber R1 is discharged into the reservoir tank 25 through the reaction-force chamber R4 and the second oil pressure discharge line 36. In this case, therefore, the fourth linear valve 37 is closed, and the target output oil pressure Prt is calculated by using a suitable map, based on the pedal pressure Fp detected by the pedal pressure sensor 53.

In step S34, it is determined whether a defect in the hydraulic system for supplying the braking oil pressures is detected, based on the result of determination on a defect in the oil hydraulic channel leading to the front wheels in step S19 and the result of determination on a defect in the oil hydraulic channel leading to the rear wheels in step S20. If no defect is detected in the hydraulic system, the target reaction-force oil pressure Pvt is calculated in step S35, using a map that is set in advance based on the pedal stroke Sp. Alternatively, the target reaction-force oil pressure Pv may be set based on the braking oil pressure Pr detected by the first pressure sensor 56, from the relationship between the braking oil pressures Pf, Pr.

If a defect is detected in the hydraulic system in step S34, the ECU 51 proceeds to step S36. Since the braking oil pressure Pf is reduced relative to the braking oil pressure Pr when a defect arises in the oil hydraulic channel through which the braking oil pressure is applied to the front wheels, the defect in the oil hydraulic channel leading to the front wheels is detected based on a difference between the braking oil pressures Pr and Pf, as shown in FIG. 23. When a defect arises in the oil hydraulic channel leading to the front wheels, the braking devices of only the rear wheels operate to produce braking force, and the total braking force of the vehicle is reduced to some extent. In this case, therefore, the target reaction-force oil pressure Pvt is set to a relatively low level so that the reaction force matches the deceleration of the vehicle. On the other hand, since the braking oil pressure Pr is reduced relative to the target output oil pressure Prt when a defect arises in the oil hydraulic channel through which the braking oil pressure is applied to the rear wheels, the detect in the oil hydraulic channel leading to the rear wheels is detected based on a difference between the oil pressures Prt and Pr, as shown in FIG. 24. When a defect arises in the oil hydraulic channel leading to the rear wheels, the braking devices of only the front wheels operate to produce braking force, and the total braking force of the vehicle is reduced to some extent. In this case, therefore, the target reaction-force oil pressure Pvt is set to a relatively low level so that the reaction force matches the deceleration of the vehicle.

Once the target output oil pressure Prt and the target reaction-force oil pressure Pvt are set or calculated in the manners as described above, the ECU 51 proceeds to step S37 to adjust the openings of the first and second linear valves 30, 32 based on the calculated target output oil pressure Prt, and adjust the openings of the third and fourth linear valves 35, 37 based on the calculated target reaction-force oil pressure Pvt. Then, the braking oil pressure Pr is delivered from the first pressure chamber R1, and the braking oil pressure Pf is delivered from the third pressure chamber R3. The braking oil pressures Pr, Pf are applied to the respective wheel cylinders 39FR, 39FL, 39RR and 39RL via the ABS 40, so that appropriate braking forces commensurate with the operating force applied to the brake pedal 14 by the driver are generated in the front wheels FR, FL and rear wheels RR, RL. Furthermore, appropriate reaction force commensurate with the operating force of the brake pedal 14 is exerted on the driver.

The braking force control and reaction force control, which are hydraulic controls, cannot be performed when a failure of any one of the linear valves 30, 32, 35, 37 is detected in step S13, or when a failure of the reaction-force applying mechanism is detected in step S17, or when an abnormality in the braking oil pressure is detected in step S18, or when a difference between the outputs of the first and second pressure sensors 56, 57 is found in step S22. In these cases, the operating force applied to the brake pedal 14 by the driver is directly transmitted from the input piston 12 to the pressure piston 13 so as to produce braking oil pressures Pf, Pr, which in turn drive the wheels cylinders 39FR, 39FL, 39RR, 39RL via the ABS 40 so as to apply braking forces to the front wheels FR, FL and rear wheels RR, RL.

While the control processes for detecting failures or abnormalities associated with the vehicular brake system of the first embodiment have been explained in detail in the sixth embodiment, the failure detection control of this embodiment may be equally applied to the vehicular brake systems of the second through fifth embodiments, to yield substantially the same effects.

INDUSTRIAL APPLICABILITY

As described above, the vehicular brake system according to the invention is able to generate braking oil pressure in accordance with the amount of operation of an operating device (e.g., brake pedal), and is also able to absorb the operating force of the brake pedal and exert reaction force commensurate with the amount of operation on the operating device. Thus, the vehicular brake system of the invention may be favorably applied to any type of brake system.

The invention claimed is:

1. A vehicular brake system comprising:
    an input piston that is supported in a cylinder to be movable in an axial direction of the cylinder;
    an operating device coupled to the input piston;
    a pressure piston that is disposed coaxially with the input piston and is supported in the cylinder to be movable in the axial direction;
    control oil pressure setting means for setting a control oil pressure in accordance with an amount of operation of the operating device which is received by the input piston;
    oil pressure supplying means for applying the control oil pressure set by the control oil pressure setting means to the pressure piston so as to generate a braking oil pressure being directly applied to a wheel cylinder; and
    operating force absorbing means for absorbing operating force applied from the operating device to the input piston,
    wherein the pressure piston is supported in the cylinder to be movable in the axial direction such that one of the input piston and the pressure piston is at least partially received in the other and such that the pressure piston can be pressed by the input piston, and the operating force absorbing means comprises a discharge passage that allows a hydraulic oil to be discharged from a pressure chamber located between the input piston and the pressure piston so as to absorb operating force applied from the operating device when the input piston moves in response to the operating force.

2. A vehicular brake system as defined in claim 1, wherein a first pressure-receiving area of the input piston which receives a hydraulic pressure of the pressure chamber and a second pressure-receiving area of the pressure piston which receives the control oil pressure from the oil pressure supplying means are set to be substantially equal to each other.

3. A vehicular brake system as defined in claim 1, further comprising
    reaction-force setting means for setting a reaction force in accordance with the amount of operation of the operating device which is received by the input piston; and
    reaction-force supplying means for applying the reaction force set by the reaction-force setting means to the input piston so as to exert the reaction force on the operating device.

4. A vehicular brake system as defined in claim 1, further comprising
    reaction-force generating means for generating a reaction force to be applied to the operating device via the input piston; and
    reaction-force restricting means for restricting the reaction force applied to the operating device by the reaction-force generating means upon occurrence of an abnormality.

5. A vehicular brake system as defined in claim 4, wherein the reaction-force restricting means includes a solenoid-operated valve or a relief valve.

6. A vehicular brake system as defined in claim 1, wherein
    a flange is provided on the pressure piston, the flange of the pressure piston is movably supported by an inner circumferential surface of the cylinder,
    a support member is press-fitted or screwed in the cylinder such that an outer circumferential surface of the support member is fixed to the inner circumferential surface of the cylinder, the input piston is movably supported by the support member, and
    a second pressure chamber is formed between the flange of the pressure piston and the support member in the cylinder.

7. A vehicular brake system comprising:
    an input piston that is supported in a cylinder to be movable in an axial direction of the cylinder;
    an operating device coupled to the input piston;
    a pressure piston that is disposed coaxially with the input piston and is supported in the cylinder to be movable in the axial direction such that one of the input piston and the pressure piston is at least partially received in the other and such that the pressure piston can be pressed by the input piston;
    a control oil pressure setting unit that sets a control oil pressure in accordance with an amount of operation of the operating device which is received by the input piston;
    an oil pressure supplying unit that applies the control oil pressure set by the control oil pressure setting unit to the pressure piston so as to generate a braking oil pressure being directly applied to a wheel cylinder; and
    a discharge passage that allows a hydraulic oil to be discharged from a pressure chamber located between the input piston and the pressure piston so as to absorb operating force applied from the operating device when the input piston moves in response to the operating force.

* * * * *